US011629469B2

(12) United States Patent
Olsen

(10) Patent No.: US 11,629,469 B2
(45) Date of Patent: Apr. 18, 2023

(54) FLOOD PROTECTION

(71) Applicant: Steen Olsen Invest ApS, Fredericia (DK)

(72) Inventor: Steen Christian Olsen, Kolding (DK)

(73) Assignee: STEEN OLSEN INVEST APS, Fredericia (DK)

( * ) Notice: Subject to any disclaimer, the term of this patent is extended or adjusted under 35 U.S.C. 154(b) by 0 days.

(21) Appl. No.: 16/499,344

(22) PCT Filed: Mar. 26, 2018

(86) PCT No.: PCT/DK2018/050055
§ 371 (c)(1),
(2) Date: Sep. 30, 2019

(87) PCT Pub. No.: WO2018/177489
PCT Pub. Date: Oct. 4, 2018

(65) Prior Publication Data
US 2021/0102352 A1 Apr. 8, 2021

(30) Foreign Application Priority Data
Mar. 30, 2017 (DK) ............................ PA 2017 70235

(51) Int. Cl.
*E02B 7/20* (2006.01)
*E02B 7/46* (2006.01)
(Continued)

(52) U.S. Cl.
CPC ................ *E02B 3/104* (2013.01); *E02B 7/42* (2013.01)

(58) Field of Classification Search
CPC ... E02B 7/20; E02B 3/102; E02B 7/26; E02B 3/106; E02B 5/082; E02B 7/42;
(Continued)

(56) References Cited

U.S. PATENT DOCUMENTS 196,686 A * 10/1877 Marshall ................... E02B 7/44
405/102
215,148 A * 5/1879 Möller ...................... E02B 7/42
405/100
(Continued)

FOREIGN PATENT DOCUMENTS

CH 698441 B1 8/2009
CN 102652198 A 8/2012
(Continued)

*Primary Examiner* — Edwin J Toledo-Duran
(74) *Attorney, Agent, or Firm* — Crowell & Moring LLP; John C. Freeman

(57) ABSTRACT

The invention concerns a flood protection for protecting a back area against rising water level from a front area, the flood protection operating between a bottom and a water surface, including at least one barrier element with a longitudinal direction and a height direction, the longitudinal direction during operation extending substantially transversely of an area, e.g. a stream, a fjord, a river or an estuary, and the height direction during operation extending from the bottom of an area, e.g. a stream, a fjord, a river or an estuary, and up, where the at least one barrier element during operation interacts with a base arranged at the bottom of the actual area. The invention also concerns a method for operating such a flood protection. The new feature of the flood protection according to the invention is that it includes a movable and buoyancy balanced barrier element that includes an adjustable ballast system for regulating the buoyancy balance, the base of the flood protection including a bottom rail system, and the barrier elements including contact means arranged for contact with the bottom rail system.

17 Claims, 18 Drawing Sheets

(51) Int. Cl.
  *E02B 3/10* (2006.01)
  *E02B 7/42* (2006.01)

(58) Field of Classification Search
  CPC . E02B 9/027; E02B 3/104; E02B 7/28; E02B 7/36; E02B 7/50; E02B 8/00; E02B 7/205; E02B 7/54; E02B 7/44; E02B 13/02; E02B 7/005; E02B 7/40; E02B 8/085; E02B 8/06; E02B 9/00; E02B 7/32; E02B 13/00; E02B 7/16; E02B 7/18; E02B 7/46; E02B 7/52; E02B 8/045; E02B 9/04; E02B 3/023; E02B 3/00; E02B 3/043; E02B 3/02; E02B 5/085; E02B 7/38; E02B 5/06; E02B 5/08; E02B 7/22; E02B 9/06; E02B 8/08; E02B 8/023; E02B 9/022; E02B 7/06; E02B 3/108; E02B 3/062; E02B 17/0818; E02B 15/0885; E02B 17/06; E02B 15/0835; E02B 11/00; E02B 1/006; E02B 9/02; E02B 7/34; E02B 7/14; E02B 7/08; E02B 7/00; E02B 5/02; E02B 3/10; E02B 3/041; E02B 15/0814; E02B 15/08; E02B 1/00; E02B 8/02; E02B 3/04; E02B 2201/50; E02B 9/025; E02B 7/30; E02B 8/04; E04H 9/145
  USPC ....... 405/71, 80–87, 90–92, 94, 95, 99, 100, 405/103–106; 49/10–12, 386; 52/302.1, 52/741.3; 160/123, 330; 454/275
  See application file for complete search history.

(56) References Cited

U.S. PATENT DOCUMENTS

| | | | | |
|---|---|---|---|---|
| 610,548 A * | 9/1898 | Manny | E02C 1/00 | 405/85 |
| 968,082 A | 8/1910 | Savard | | |
| 1,329,679 A * | 2/1920 | Sampson | E02B 7/205 | 137/428 |
| 1,334,354 A * | 3/1920 | Dodd | E02B 13/02 | 405/99 |
| 1,363,820 A * | 12/1920 | Sommer | E02B 7/205 | 405/97 |
| 1,422,076 A * | 7/1922 | Becher | E02B 7/42 | 405/100 |
| 1,593,306 A * | 7/1926 | Lawski | E02B 7/20 | 405/100 |
| 1,602,111 A * | 10/1926 | Frantisek | E02B 7/205 | 405/101 |
| 1,648,535 A * | 11/1927 | Broome | E02B 7/54 | 405/104 |
| 1,920,698 A * | 8/1933 | Huguenin | E02B 7/40 | 251/298 |
| 1,938,675 A * | 12/1933 | Young | E02B 7/46 | 405/101 |
| 1,985,872 A * | 12/1934 | Schon | E02B 7/54 | 405/87 |
| 1,986,701 A * | 1/1935 | Zimmermann | E02B 7/54 | 49/470 |
| 2,009,234 A * | 7/1935 | Leonard | E02B 7/42 | 405/100 |
| 2,055,512 A * | 9/1936 | Wallace | F16K 3/0227 | 251/364 |
| 2,118,404 A * | 5/1938 | Frantisek | E02B 7/48 | 405/102 |
| 2,139,458 A * | 12/1938 | Peilert | E02B 8/06 | 405/100 |
| 2,192,510 A * | 3/1940 | Smith | E02B 7/36 | 405/101 |
| 2,317,975 A * | 5/1943 | Boath | E02B 7/42 | 405/100 |
| 2,322,846 A * | 6/1943 | Growdon | E02B 7/42 | 405/93 |
| RE22,745 E * | 4/1946 | Arne | E02B 7/50 | 405/101 |
| 2,529,141 A * | 11/1950 | Danel | E02B 8/06 | 405/108 |
| 2,551,678 A * | 5/1951 | Frantisek | E02B 7/48 | 405/100 |
| 2,598,389 A * | 5/1952 | Frantisek | E02B 9/025 | 405/94 |
| 2,621,484 A * | 12/1952 | Frantisek | E02B 7/205 | 405/93 |
| 2,904,963 A * | 9/1959 | Lewin | E02B 7/42 | 405/97 |
| 2,909,899 A * | 10/1959 | Ramsden | E02B 7/42 | 403/81 |
| 2,966,777 A * | 1/1961 | De Brito | E02B 7/205 | 405/94 |
| 2,994,199 A * | 8/1961 | Martin | E02B 7/20 | 405/92 |
| 3,133,518 A * | 5/1964 | Burnett | E02B 7/50 | 114/45 |
| 3,221,504 A * | 12/1965 | Turner | E02B 7/205 | 405/96 |
| 3,316,934 A * | 5/1967 | Sowers | E04H 4/1272 | 137/578 |
| 3,331,208 A * | 7/1967 | Aubert | E02B 5/06 | 405/84 |
| 3,336,756 A * | 8/1967 | Isenberg | E02B 7/42 | 405/100 |
| 3,505,822 A * | 4/1970 | Schulz | E02B 7/42 | 405/100 |
| 3,543,521 A * | 12/1970 | Aubert | E02B 7/205 | 405/96 |
| 3,693,356 A * | 9/1972 | Mayo, Jr. | E02B 9/04 | 415/147 |
| 3,739,585 A | 6/1973 | Dubouchet | | |
| 3,756,032 A * | 9/1973 | Solinas | E02B 7/44 | 405/92 |
| 3,925,999 A * | 12/1975 | Andrew | E02B 7/20 | 405/101 |
| 3,935,711 A * | 2/1976 | Sawai | E02B 7/44 | 405/100 |
| 4,073,147 A * | 2/1978 | Nomura | E02B 7/44 | 405/101 |
| 4,103,497 A * | 8/1978 | Colamussi | E02B 7/44 | 405/101 |
| 4,146,346 A * | 3/1979 | Salo | E02B 3/02 | 405/80 |
| 4,394,098 A * | 7/1983 | Wirschal | E02B 9/02 | 405/87 |
| 4,836,711 A * | 6/1989 | Sala | E02B 7/44 | 405/102 |
| 4,934,867 A * | 6/1990 | Cardis | E02B 7/54 | 405/101 |
| 4,963,057 A * | 10/1990 | Fournier | E02B 7/205 | 405/92 |
| 5,171,102 A * | 12/1992 | De Wit | E02B 7/54 | 405/101 |
| 5,178,490 A * | 1/1993 | Snowberger | E02B 7/44 | 405/102 |
| 5,199,812 A * | 4/1993 | McClellan | E02B 7/44 | 405/101 |
| 5,222,834 A * | 6/1993 | Schultz | E02B 7/44 | 405/102 |
| 5,433,555 A * | 7/1995 | Parizot | E02B 7/16 | 405/101 |
| 5,460,462 A * | 10/1995 | Regan | E06B 9/00 | 405/87 |
| 5,577,863 A * | 11/1996 | Nottle | E02B 7/205 | 405/101 |
| 5,709,502 A * | 1/1998 | Obermeyer | B60C 15/02 | 405/91 |
| 6,287,050 B1 * | 9/2001 | Montgomery | F24F 11/76 | 52/573.1 |

(56) References Cited

U.S. PATENT DOCUMENTS

| | | | | |
|---|---|---|---|---|
| 6,623,209 B1* | 9/2003 | Waters, Jr. | ............... | E02B 7/44 |
| | | | | 405/100 |
| 6,755,591 B1* | 6/2004 | Rees | ......... | E02B 8/06 |
| | | | | 405/87 |
| 7,037,039 B1* | 5/2006 | Werts | ......... | E02B 7/40 |
| | | | | 405/87 |
| 7,114,879 B2* | 10/2006 | Obermeyer | ............ | E05F 15/53 |
| | | | | 405/91 |
| 8,714,875 B2* | 5/2014 | Morii | ......... | E02B 7/50 |
| | | | | 405/28 |
| 8,919,044 B2* | 12/2014 | Baumert | .......... | E06B 1/70 |
| | | | | 49/470 |
| 8,992,121 B2* | 3/2015 | Cardis | ......... | E02B 7/20 |
| | | | | 405/99 |
| 9,783,946 B2* | 10/2017 | Terata | ......... | E02B 7/38 |
| 9,970,170 B2* | 5/2018 | Terata | ......... | E02B 8/04 |
| 10,161,093 B2* | 12/2018 | Adler | ......... | E02B 3/102 |
| 2010/0129156 A1 | 5/2010 | Taylor | ......... | E02B 3/108 |
| | | | | 405/114 |
| 2012/0034032 A1* | 2/2012 | Waters, Jr. | ............ | E02B 3/104 |
| | | | | 405/92 |
| 2012/0163916 A1* | 6/2012 | Waters, Jr. | ............. | E02B 7/50 |
| | | | | 405/112 |
| 2012/0163917 A1* | 6/2012 | Waters, Jr. | ............ | E02B 3/102 |
| | | | | 405/114 |
| 2013/0055946 A1* | 3/2013 | Conway | ......... | E02B 7/50 |
| | | | | 114/333 |
| 2014/0193202 A1* | 7/2014 | Arai | ......... | E02B 7/40 |
| | | | | 405/100 |
| 2014/0230328 A1* | 8/2014 | Inui | ......... | E06B 5/003 |
| | | | | 49/11 |
| 2014/0328628 A1* | 11/2014 | Nakayasu | ............... | E02B 7/44 |
| | | | | 405/26 |
| 2015/0218767 A1* | 8/2015 | Terata | ......... | E02B 7/44 |
| | | | | 405/99 |
| 2016/0076268 A1* | 3/2016 | Waters, Jr. | ............. | E06B 9/04 |
| | | | | 49/11 |
| 2016/0289909 A1 | 10/2016 | Cadogan | | |
| 2017/0284047 A1* | 10/2017 | Terata | ......... | E02B 7/38 |
| 2018/0258600 A1* | 9/2018 | Terata | ......... | E02B 7/40 |
| 2019/0194894 A1* | 6/2019 | Terata | ......... | E02B 7/50 |

FOREIGN PATENT DOCUMENTS

| | | |
|---|---|---|
| CN | 104018472 A | 9/2014 |
| CN | 204151757 U | 2/2015 |
| CN | 105980633 A | 9/2016 |
| CZ | 2015281 A3 | 11/2016 |
| DE | 1017988 B | 10/1957 |
| DE | 2838431 B1 | 9/1979 |
| DE | 2915562 A1 | 11/1980 |
| DE | 19539611 A1 | 6/1996 |
| EP | 3397609 A1 | 11/1990 |
| EP | 1726717 A2 | 11/2006 |
| FR | 2292806 A1 | 6/1976 |
| GB | 1340865 A | 12/1973 |
| GB | 1415525 A | 11/1975 |
| GB | 2042030 A | 9/1980 |
| GB | 2488809 A | 9/2012 |
| JP | 2009191563 A | 8/2009 |
| RU | 2037601 C1 | 6/1995 |
| WO | 9730230 A1 | 8/1997 |
| WO | 2016110438 A1 | 7/2016 |
| WO | 2017051481 A1 | 5/2018 |

* cited by examiner

| Effect of vertical component of high water pressure by 9.4 metre water level at the low water side ||||||
|---|---|---|---|---|---|
| Depth high water side [metres] | Horizontal load [ton/m] | Angle from high water side [degrees] | Sin (v) | Vertical component [ton/m] | Extra lift [ton/m] |
| 9.40 | 0.00 | 24 | 0.41 | 0.00 | 0.00 |
| 9.50 | 0.94 | 22 | 0.37 | 0.35 | 0.35 |
| 9.60 | 1.85 | 20 | 0.34 | 0.63 | 0.63 |
| 9.70 | 2.87 | 18 | 0.31 | 0.89 | 0.89 |
| 9.79 | 3.68 | 16 | 0.28 | 1.02 | 1.02 |
| 9.89 | 4.61 | 14 | 0.24 | 1.11 | 1.11 |
| 9.99 | 5.51 | 12 | 0.21 | 1.15 | 1.15 |
| 10.08 | 6.41 | 10 | 0.17 | 1.11 | 1.11 |
| 10.18 | 7.30 | 8 | 0.14 | 1.02 | 1.02 |
| 10.27 | 8.18 | 6 | 0.10 | 0.85 | 0.85 |
| 10.36 | 9.04 | 4 | 0.07 | 0.63 | 0.63 |
| 10.45 | 9.91 | 2 | 0.03 | 0.35 | 0.35 |
| 10.54 | 10.75 | 0 | 0.00 | 0.00 | 0.00 |

FLOOD PROTECTION

This application claims the benefit of Danish Application No. PA 2017 70235 filed Mar. 30, 2017 and PCT/DK2018/050055 filed Mar. 26, 2018, International Publication No. WO 2018/177489 A1, which are hereby incorporated by reference in their entirety as if fully set forth herein.

FIELD OF THE INVENTION

The invention concerns a flood protection for protecting a back area against rising water level in a front area, the flood protection operating between a bottom and a water surface, the flood protection including at least one barrier element having a longitudinal direction and a height direction, the longitudinal direction extending during operation substantially transversely of an area, e.g. a stream, a fjord, a river or an estuary, the height direction extending during operation substantially transversely of an area, e.g. a stream, a fjord, a river or an estuary, and up, and where the at least one barrier element is buoyancy balanced, the said barrier element including an adjustable ballast system for regulating the buoyancy balance, where the at least one barrier element during operation interacts with a base, the base being arranged at the bottom of the actual area.

The invention furthermore concerns a method for operating such a flood protection for protecting a back area against rising water level in a front area.

BACKGROUND OF THE INVENTION

It is commonly known to use different systems for damming up against a rising water level, caused by either tide, wind or rain. In the following description, these systems are all called flood protection, even in case of situations that are not specifically related to a flash flood or storm surge.

For example, a lot of different floodgates are known, among others at the mouths of several Danish streams into the North Sea. These floodgates operate with laterally hinged gates or with lift gates where the gates can be opened and closed according to need, whereby low-lying areas farther inland can be protected against flooding with sea water when the wind is strong from the west. Typically, free sluices or chamber floodgates are used for such tasks. Floodgate systems operate well and efficiently in order to block relatively narrow passages though at the same time they do require not insignificant construction structures. For wider passages, such as the mouth of a fjord or at an inlet, the prior art gate solutions are not suited. This is due to the extent to be dammed and also due to the construction costs and a frequently unattractive architectural influence on the area.

Moreover, it is also known with pivoting gates arranged at the seabed, and which can be pivoted up from there about a horizontal axis at the seabed when there is a need for damming up. As said, the entire structure is arranged on the seabed, which of course also requires a comprehensive construction and foundation work. In addition, there are some challenges by maintaining the system as sanding up and deposition of sediments will typically occur over time, and then there is the normal challenge of monitoring and maintaining a system mounted under water. The construction is at the same time complicated and very costly to establish at the bottom of a fjord or the like. An example of such pivoting gate is disclosed in U.S. Pat. No. 3,543,521 A.

Yet a variant of a flood protection is the so-called Moses gates known from Venice. These gates are also arranged at the seabed in a base, but are elevated only by letting compressed air displace water from the interior of the gate elements. The buoyancy of the gate elements is increased hereby, and therefore they are lifted off the seabed and act as a high tide protection. By this solution a complex and vulnerable chain drive or other hoisting means for lifting the gate elements up from the seabed is avoided. With regard to maintenance and inspection there is no big difference between Moses gates and the above mentioned pivoting leaf gates.

The drawback of the said types of flood protections is that they require substantial foundations and/or constructions that typically are large and unsightly, and not the least costly to establish and to replace when the time comes. The reason for the size of the foundations/constructions is that they have to resist the horizontal forces arising when water is to be kept from penetrating into a given area. The forces on the two opposing sides of a flood protection obviously remain in balance as long as the water level is the same at both sides, but when the water level rises at one side, horizontal forces to be absorbed by the foundation of the construction in question arise.

GB 2488809 A discloses a system of a floating weir where a barrier can rotate about a shaft along a base at the bottom. Water can be introduced in the buoyancy balanced barrier which is substantially constituted by a triangular shape.

OBJECT OF THE INVENTION

The object of the present invention is to indicate a solution for a flood protection by which is achieved a good, efficient and simple solution by which a rising water level can be retained at an outer side of a flood protection, thereby avoiding or at least minimising possible flooding of a low-lying area at the inner side of the flood protection.

The object is also to provide a flood protection where the foundation or base is neither loaded with vertical nor horizontal forces to the same extent as it is known by the prior art solutions, for example the solutions mentioned above.

It is furthermore the object of the invention to indicate a method for activating, deactivating as well as storing such a flood protection.

DESCRIPTION OF THE INVENTION

As indicated above and in the preamble of claim 1, the invention concerns a flood protection for protecting a back area against rising water level in a front area, the flood protection operating between a bottom and a water surface, the flood protection including at least one barrier element having a longitudinal direction and a height direction, the longitudinal direction during operation extending substantially transversely of an area, e.g. a stream, a fjord, a river or an estuary, the height direction during operation extending substantially transversely of an area, e.g. a stream, a fjord, a river or an estuary, and up, and where the at least one barrier element is buoyancy balanced, the said barrier element including an adjustable ballast system for regulating the buoyancy balance, where the at least one barrier element during operation interacts with a base, the base being arranged at the bottom of the actual area.

The new feature of the flood protection according to the invention is that the base of the flood protection includes a bottom rail system wherein the at least one barrier element includes a contact, the contact is arranged for contact with the bottom rail system, and that the at least one barrier element is movable as the at least one barrier element is not permanently connected with the bottom rail system.

The bottom rail system and the contact are NOT permanently connected and only interact by the barrier element resting with a balanced force according to how the ballast is regulated in respective barrier elements. Therefore, this is a "loose connection" between bottom rail system and barrier element(s). A contact face is arranged in the bottom rail system, forming abutment for the contact of the barrier element when the barrier element is in position. On one or both of these packings can be arranged which by contact between barrier element and bottom rain prevent water from flowing freely from one side of the flood protection to the other side. In a simple embodiment, this may be an elastic cover or lip on the contact of the barrier element, e.g. a rubber sealing.

A basic principle of the invention is that the force transmission can be provided along the entire structure, thereby reducing price and complexity due to the simplified base construction. Thus there is a force transmission from barrier element to base along the entire length. This is unlike conventional flood protections where the force is transmitted to a base at single points, as e.g. by hinges in conventional floodgates.

In situations where a very tight closing of the flood protection is advantageous, e.g. at harbour inlets, the packings can be inflatable. This is the case with the packings between barrier element and bottom rail and packings between barrier element and side piece. The packings can also act as shock absorbers when delivering the barrier element. Moreover, the packings can maintain a possible tight shut off if the base structure should change over time due to e.g. soft bottom conditions or the like.

The bottom rail system can e.g. be U- or I-shaped and interact with a corresponding shape on respective barrier elements. In a preferred variant of a bottom rail system, it may advantageously be fixed by rammed piles, or the bottom rail system can be fixed by the known "suction bucket principle". Thereby no substantial action on the bottom is produced as no extensive digging or extensive construction works are to be performed. The bottom rail system can be laid out in sections that are placed and anchored by suitable processes on the bottom, after which the system is ready to receive respective barrier elements. The construction costs are relatively low due to the simple principle.

The bottom anchoring may advantageously be provided as a sheet piling driven down into the bottom. If the bottom rail system is made with an internal cavity, this can be used as adjustable ballast and be partly or completely filled with water.

In addition, it is to be mentioned that the bottom does not necessarily have to be horizontal. The base can therefore follow the profile of the course of the bottom and the barrier elements be adapted thereto.

A flood protection according to the invention can be designed such that the at least one buoyancy balanced barrier element includes a fixed ballast and an adjustable ballast, where the adjustable ballast is constituted by water. The fixed ballast has the purpose of ensuring almost equilibrium for the barrier elements, which may be effected by concrete, iron, rocks or other suitable ballast. The adjustable ballast is most advantageously made up of water as this is abundantly available during use of the flood protection. When the individual barrier elements are placed, a ballast adjustment can be performed such that a sufficient but still modest downward action of force on the bottom rail system is attained. It is only to provide sealing against a flow from one side to the other that this force is established. More adjustment can be performed during use in case of situations where this is relevant.

A flood protection according to the invention is particular in that the at least one barrier element is arranged with its centre of buoyancy higher than its centre of gravity and therefore stable.

When the barrier element is stable, it will be self-arighting for a tilting angle less than the so-called AVS (Angle of Vanishing Stability), which is also known from e.g. ships. This means that the barrier element, which is kept in place at the bottom in or on the mentioned bottom rail system, can tilt to one side when a difference in water level arises at one of the two sides of the barrier element, but still upholding a blockage.

During common use, the flood protection will typically be established in order to protect e.g. a harbour or residential area against flooding in connection with a storm surge or other situation that may cause an unwanted rise in water level. Therefore, it will typically be seawater which is blocked, why the barrier elements can be adapted to primarily tilt to one side, namely towards land, as the water is pressing on the outer side. By having the centre of gravity as low as possible and thus under the centre of buoyancy, a good stability is achieved, and at the same time a limited tilting of the individual barrier elements.

In an embodiment, a flood protection according to the invention can include that the contact of the at least one barrier element and the bottom rail system are arranged such that the barrier element under the action of a greater water pressure at one side than at the other side is allowed to tilt at a given angle relative to the bottom rail system, whereby the center of buoyancy of the barrier element is displaced in relation to its center of gravity.

By tilting and thereby displacement of buoyancy center relative to the center of gravity is achieved a tilting moment that will act on the bottom rail system and the contact with a horizontal force is proportional to the magnitude of the tilting moment arising when buoyancy center and gravity center are mutually displaced. In addition, a resulting force arises in opposite direction, pressing against the higher water pressure in front of—i.e., at the external side of—the flood protection. Hereby balance is produced in the system, and the forces from the higher water level at one side of the flood protection are absorbed as horizontal forces in the system. Possible vertical forces, i.e., forces pressing on the bottom rail system, are balanced by adjusting the buoyancy of respective barrier element(s). This adjustment is effected, if necessary at all, by adapting the amount of ballast in the individual barrier elements.

In an embodiment, the flood protection according to the invention can include that at least one of the contact of the at least one barrier element and the bottom rail system include a passive valve, the passive valve being activated when the water pressure is greater behind the flood protection than in front thereof.

By such passive valve, an advantage is achieved such that when the water level drops again and the flood protection can be deactivated, water at the back side of the flood protection can be allowed to pass the flood protection, whereby balance is established again in the respective barrier elements, meaning that buoyancy center and gravity center are aligned opposite each other again. This occurs by the water behind pressing with greater force on the barrier elements than the water in front thereof. A horizontal force is hereby attained, moving the barrier elements in relation to the bottom rail system. The bottom rail system or the lowermost part of the barrier elements, alternatively both, have a kind of spacer block that allows water to pass one way. This is only possible when there is a greater pressure on the back side than on the front side of the barrier elements. The drawings below show an example of such a variant of the invention.

In a variant of a flood protection according to the invention, the at least one barrier element can be formed with a substantially tapering cross-section, the narrow end of which facing the bottom rail system, and the wide end thus facing upwards.

By having a more or less symmetrical cross-section of the barrier element and by having an increased volume at the top and a fixed ballast at the pointed bottom bare it is ensured that the centre of buoyancy is disposed over the centre of gravity, thereby achieved an inherent stability. The fixed ballast is located, as mentioned, at the pointed end, and also there may be arranged contact means for bearing against the bottom rail system. The fixed ballast is balanced such that the barrier element can float and thus be towed in position in the rail system in an operating position or in a depository for storage. A suitable shape has appeared substantially to correspond to a section of a cylinder comprising an angle of about 60°. However, obviously other shapes or sizes could be suitable as well. The most attractive design may advantageously be determined according to the normal water level and the typical water level in case of e.g. a storm surge. The important thing at any time must be that a flood protection according to the invention is optimised for the location on which it is to be implemented.

In a particular variant of a flood protection according to the invention, the at least one barrier element may include an adjustable barrier arranged tiltable or movable in other ways at the upper edge of the barrier element.

The said barrier can therefore be pivoted up or moved to an active position in case that the water level in the front area is expected to rise to a height that is higher than the body of the barrier element itself. If the water level should rise more and over the body of the barrier element as well as the barrier, the barrier elements will remain active and stable and only allow an overflow, but they will not break down or overturn and become unstable.

Such a barrier may advantageously be designed as a kind of leaf that is pivoted in position about an axis in the longitudinal direction of the barrier element, and then locked in this position, either by a positive fixation or alternatively by making the hinge design self-locking. Such a pivoting leaf can e.g. be one metre high and even more. The important thing about the height of the leaf is that it is dimensioned in relation to the total buoyancy and shape of the barrier element itself, and not the least in relation to how much the barrier element will be tilted under the action of the greater water pressure at one side.

In yet a variant of a flood protection according to the invention, the at least one barrier element can be arranged pivoting about a substantially vertical axis, whereby the at least one barrier element after pivoting about the axis is lowered into position in a bottom rail system, thereby providing blockage between a front area and a back area.

The said variant of a flood protection is particularly suited for use in e.g. streams and rivers with limited extension in width, corresponding to the longitudinal direction of the flood protection. The flood protection can in such cases be established either from one or from both sides of the stream in question, and this can be provided by a relatively simple construction with the primary object of being able to pivot a barrier element into position in an active or in a passive position. The pivot mechanism is therefore not to be able to transmit more force than necessary in order to perform the positioning of the barrier elements itself. All forces arising from the operation itself, i.e. when a higher water level occurs at one side of the barrier elements, are primarily absorbed by the barrier elements and partly by the bottom rail system, whereas the pivot mechanism is only marginally loaded under operation.

In an embodiment, the flood protection according to the invention can include at least two or more barrier elements, where at least one end face of a barrier element includes sealing means for bearing against an end face of an adjacent barrier element.

The variant of a flood protection may e.g. be provided with a seal in the form of a kind of fender (a resilient plastic or rubber element) arranged at the ends of the barrier elements. In an embodiment, respective ends of two adjacent barrier elements can both be equipped with a seal sealing that either abut on each other or supplement each other, e.g., by being arranged reversed in relation to each other. By having a seal at the ends of the barrier elements is achieved the advantage that they can be moved in relation to each other and obviously also that no water more than required at most will penetrate through the flood protection. According to the application, a more or less tight joint can be aimed at. If the flood protection protects a large basin, such as, e.g., a fjord, obviously it is not an object to provide a completely tight joint between two adjacent ends, but the joint is not to allow any substantial through-flow either. If the flood protection protects a small basin, e.g., a harbor and/or assets of high value like, e.g., a transformer station, a joint that is as tight as possible is sought.

According to a further embodiment, the flood protection according to the invention is peculiar in that the bottom rail system is formed by a single rail, where only the barrier element bears against one side of the bottom rail system.

The side of the bottom rail system against which the barrier element bears preferably faces the front area.

According to a further embodiment, the flood protection according to the invention is peculiar in that the base substantially follows the bottom course in longitudinal direction, and that the at least one barrier element is adapted so as in operation to follow the base in the longitudinal direction.

Hereby is achieved a cheap design compared with flood protections that require a horizontal base, as cost-intensive work at the bottom of the area can be reduced or completely avoided.

According to a further embodiment, the flood protection according to the invention is peculiar in that the base is substantially anchored at the bottom by a sheet piling. Hereby is achieved a cheap anchoring of the base on the bottom. This embodiment is advantageous particularly when establishing flood protection with large dimensions in longitudinal direction, as establishing conventional bases and foundations frequently is too expensive.

According to a further embodiment, the flood protection according to the invention is peculiar in that the at least one barrier element includes a sub-section of surface that during high tide will be in an area near the water surface in front area, the sub-section forming a depression receiving water when the barrier element is tilting by higher water level in the front area than in the back area, such that the weight of the received water counteracts a further buoyancy force arising when the barrier element is tilting in relation to an equilibrium position with equal water levels in the front area and the back area.

According to a further embodiment, the flood protection according to the invention is peculiar in that the end faces of the at least one barrier element include a supplemental part extending in height direction from the sub-section of surface towards the top of the barrier, and having an extension from the barrier towards the front area, on which supplemental part there is provided a sub-section of the sealing means.

A flood protection can be made with a gangway upon the barrier elements such that they can be serviced and/or inspected during use, or alternatively such a gangway can be used for recreational purposes. The previously mentioned barrier in the form of a leaf at the top edge of the barrier elements may e.g. constitute a railing for such a gangway. In that case, such a barrier may advantageously be established at either side of the top edge of the barrier elements. A more simple form of railing may of course be established also.

A special variant of a flood protection can be made with a floating body that is mounted via a translational suspension at the low level water side of a gate element, and together constituting a barrier element. This variant is particularly suited for reducing the action of force of a frame or a bottom rail system in an existing floodgate or storm surge protection. This may be relevant in cases where the structure begins to show weakness due to aging or other degradation. By mounting a ballast-balanced floating body at the low water side of a gate element is achieved a supporting effect due to the tilting moment counteracting the water pressure on the frame/bottom rail system, thereby relieving the latter compared with the previous design. At the same time is achieved the advantage that the barrier element itself can be designed as a gate; it may even be an existing gate in a floodgate or similar which is rebuilt and added a floating body. The translational suspension is only to ensure that the floating body is kept in place against the wall of the gate element at the desired level relative to the water level.

Irrespectively whether blocking is provided by one or the other type of barrier elements, a rise in water level will typically occur at the outer side, i.e. in front of the barrier elements, as well as at the inner side, i.e. behind the barrier elements. This is due to the fact that typically water from the hinterland will constantly be supplied, irrespectively of a storm surge pressing water from outside and into e.g. a fjord or stream.

The invention furthermore concerns a method for establishing a flood protection for protecting a back area against rising water level from a front area, the flood protection operating between a bottom and a water surface, the flood protection including at least one barrier element with a longitudinal direction and a height direction, the longitudinal direction during operation extending substantially transversely of an area, e.g. a stream, a fjord, a river or an estuary, and the height direction during operation extending from the bottom of an area, e.g. a stream, a fjord, a river or an estuary, and up, where the at least one barrier element during operation interacts with a base, the base being arranged at the bottom of the actual area.

The new feature of a method according to the invention is that establishing the flood protection at least includes the following method steps:
- disposing one or more buoyancy balanced barrier elements above a bottom rail system;
- adapting the amount of ballast in respective barrier elements such that the barrier elements are fixed against horizontal movement in the bottom rail system.

Hereby is achieved a solution where respective barrier elements are placed in an area when a need therefor is foreseen. A storm surge or other situation causing higher water level will typically be predicted up to two days in advance. Then there is ample time for bringing the required barrier elements in position in the bottom rail system arranged for the purpose. As the individual barrier elements are floating, they may readily be towed in place, and the ballast can be increased such that they are lowered into or down over the bottom rail system.

In a preferred embodiment, barrier elements for a flood protection as indicated above may advantageously be connected with chains and thereby be towed into position—as beads on a string—in the rail system, and be lowered either simultaneously or one by on into the underlying bottom rail system.

Prior to positioning the required barrier elements, the bottom rail system may advantageously be cleaned with a cleaning tool which is pulled through the bottom rail, whereby sand and other sediments are removed, thus ensuring a desired tightness between individual barrier elements and the bottom rail system. Such a cleaning tool may in principle be constituted by a "pointed plough" that lifts the unwanted sand and sediment up and out of the bottom rail system. It may also be envisaged that the cleaning is effected with a tool where water is flushed down into the bottom rail, thereby removing sand and sediment. This cleaning can be performed in many conceivable ways, and obviously the said methods are only two of many options for the skilled in the art.

When the flood protection is not in use, it may advantageously be stored in a depository adapted for the purpose, where the individual barrier elements possibly can be stored side by side. In a preferred embodiment of such a depository, the individual barrier elements can possibly be stored submerged by filling them with ballast water so that they are not visible. In some areas of natural beauty or other selected areas, this can be an advantageous solution for aesthetic reasons.

If the barrier elements for the flood protection are stored in a depository adapted for the purpose, this depository may advantageously be supplied freshwater from streams and drainpipes, whereby is achieved the possibility of switching between freshwater and saltwater in the depository. Such switching between freshwater and saltwater will contribute to reduce fouling by bacteria, plants or animals on the barrier elements as the foulings will not typically flourish both in saltwater and in freshwater. By performing a regular switching between freshwater and saltwater, and possibly brackish water, in such a depository, e.g. by switching between through-flow and overflow, the fouling can be limited to a minimum.

THE DRAWING

The invention will be described in the following in more detail with reference to the drawing, wherein.

Figure 1:
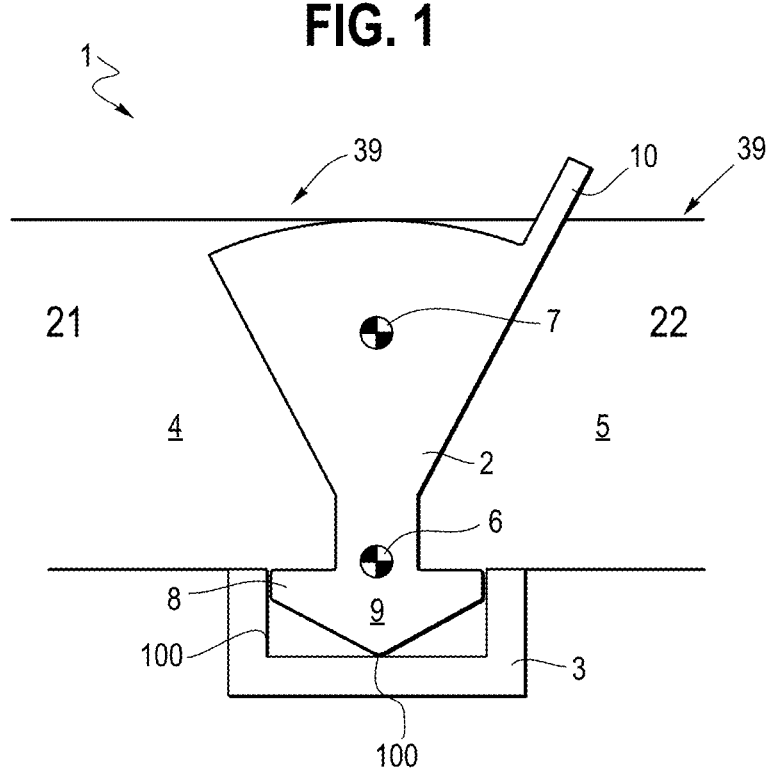
FIG. 1 shows a barrier element in a bottom rail with equal water levels at both sides.

LIST OF DESIGNATIONS 1. flood protection
2. barrier element
3. bottom rail
4. low water side
5. high water side
6. centre of gravity
7. centre of gravity
8. contact means on barrier element
9. ballast space
10. barrier
11. hinging line for barrier
12. return valve
13. depository
14. side pieces
15. railing
16. cleaning tool
17. bottom anchoring
18. floating body
19. translational bearings
20. gate element
21. back area
22. front area
23. longitudinal direction
24. height direction
25. bottom
26. fixed ballast
27. adjustable ballast
28. single rail
29. base
30. bottom course
31. sheet piling
32. sub-section of surface of barrier element
33. depression
34. supplementing part of end faces of barrier element
35. top of barrier
36. sealing means
37. end face of barrier element
38. sub-section of sealing means on end face of barrier element
39. water surface
40. gangway

DETAILED DESCRIPTION

On FIG. 1 appears a flood protection 1 including a barrier element 2 in a bottom rail 3 with equal water levels at the low water side 4 in the back area 21 and at the high water side 5 in the front area 22. The center of gravity 6 and the center of buoyancy 7 are indicated in the barrier element 2. These are superposed each other, thereby indicating a stable construction. At the bottom of the barrier element 2 are seen its contact 8 that also constitute a ballast space 9. A fixed ballast of iron, concrete or similar is arranged at the bottom of the barrier element 2, in the ballast space 9. In addition, an adjustable ballast consisting of, e.g., water can be established. The adjustable ballast may advantageously be pumped in from the surroundings by equipment adapted therefor, which is, however, not shown in the Figure.

As shown in FIG. 1, the contact 8 rests on a contact face 100 of the bottom rail 3, thereby preventing any substantial flow of water from one to the other side of the flood protection 1. In the shown variant, the contact 8 is designed such that the barrier element 2 can be tilted towards the low water side 4 as well as towards the high water side 5 while at the same time producing a greater contact surface between the contact 8 of the barrier element and the bottom rail 3.

Figure 2:
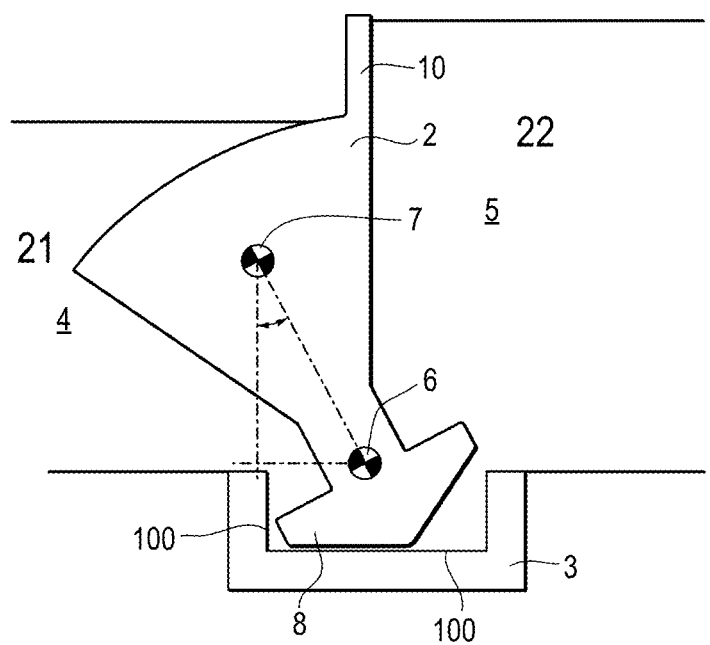
FIG. 2 shows a barrier element in a bottom rail and in operating position.

FIG. 2 shows a barrier element 2 in a bottom rail 3 and in operating position where the water level is practically as high as possible at the high water side, and where the barrier 10 is utilized to a maximum at the upper edge of the barrier element. As seen here, the barrier element is pressed to one side as a function of the higher water level at the high water side 5. The increased pressure at one side of the barrier element 2 is offset by the tilting moment arising by the displacement of the buoyancy center 7 in relation to the gravity center 6. The flood protection 1 is designed such that it is in balance by equal water levels at both sides, and such that it is tilted by an increased water level at one side, though counteracted by the moment produced by the buoyancy center being displaced in relation to the gravity center. As shown in FIG. 2, such tilting results in contact 8 of barrier element 2 contacting a contact face 100 of the bottom rail 3. At the same time, a flood protection as shown here is balanced such that only minimal vertical forces pressing on the bottom rail system 3 arise. However, it is to be mentioned that at intermediate positions from rest position, i.e., where the water level is the same at both sides, and up to fully active damming, there will be an upwardly directed force component. At the start position the angle at the high water side 5 is 24°, for example. At the opposite side, at the low water side 4, the barrier element also has an angle of about 24°, and the system is in a stable rest condition.

At full load, as seen here in FIG. 2, the barrier element 2 is now rotated 24°, the high water side 5 is now vertical, and the opposite side, the low water side, is about 48° from vertical, and the system is at rest again.

However, on the way from unloaded to maximum loaded condition, by this design there will appear a vertical pressure component. This means that the dam will float upwards until equilibrium occurs. By a low water level behind the dam of e.g. 9.4 metres and a high water level rising in front of the dam, by about 12° tilting will mean an extra lift of slightly more than one ton/metre, causing a barrier element with circular top to be lifted up about 0.34 metre relative to the bottom rail 3. This is based on the condition of equilibrium and no vertical forces acting at equal water levels, e.g. 9.4 metres at each side of a barrier element. Besides, this example is based on a flood protection 1 with a total height of 10.6 metres measured from the location of the bottom rail 3 at the bottom.

Figures 26, 27:
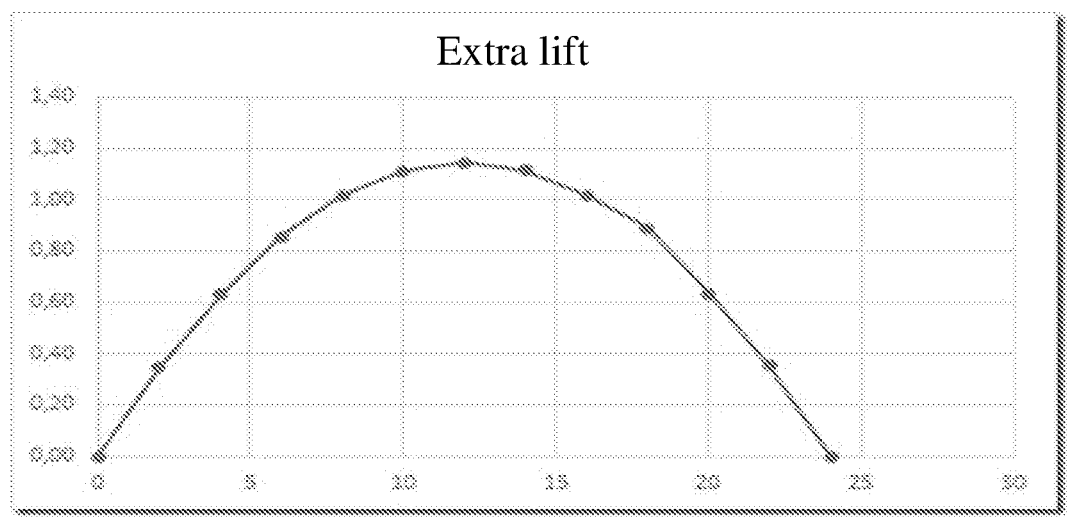
FIG. 26 shows a table of an example in numbers for the extra lift occurring during inclination.
FIG. 27 shows a diagram of the example in number for the extra lift as a function of the angle from high water side according to FIG. 26.

In FIG. 26 and FIG. 27 appears an example in numbers of the above mentioned situation where a third column indicates the angle of the high water side relative to vertical. By equilibrium, i.e. at equal water levels at both sides, the angle is 24°, and by full load it is 0°.

The sixth column indicates the extra lift [ton/metre] produced when the barrier element 2 is loaded to an inclination of 24°, corresponding to the high water side becoming vertical.

It appears from the example in numbers that an extra lift of 1.15 ton/metre arises by an inclination of 12°, which is also seen on the curve below showing the lift as a function of the angle of inclination.

This vertical displacement results in a requirement that the bottom rail system 3 can absorb the vertical displacement and still hold the rising water back, or that the ballast can be adjusted in the process in order thereby to maintain a very small load on the bottom rail 3. Alternatively, the bottom rail system 3 can be adapted to absorb this minimal load at the start and at the end, so that no lifting of the floating element occurs on the way from unloaded to fully loaded condition.

Yet an alternative can be to design the top geometry of the barrier element such that during rotation from one of the two rest positions towards to the other rest position it will lose lift, thereby providing a largely corresponding, oppositely directed force. This may be provided e.g. by designing the top of the barrier element 2 with a downwardly directed depression.

Figure 3:
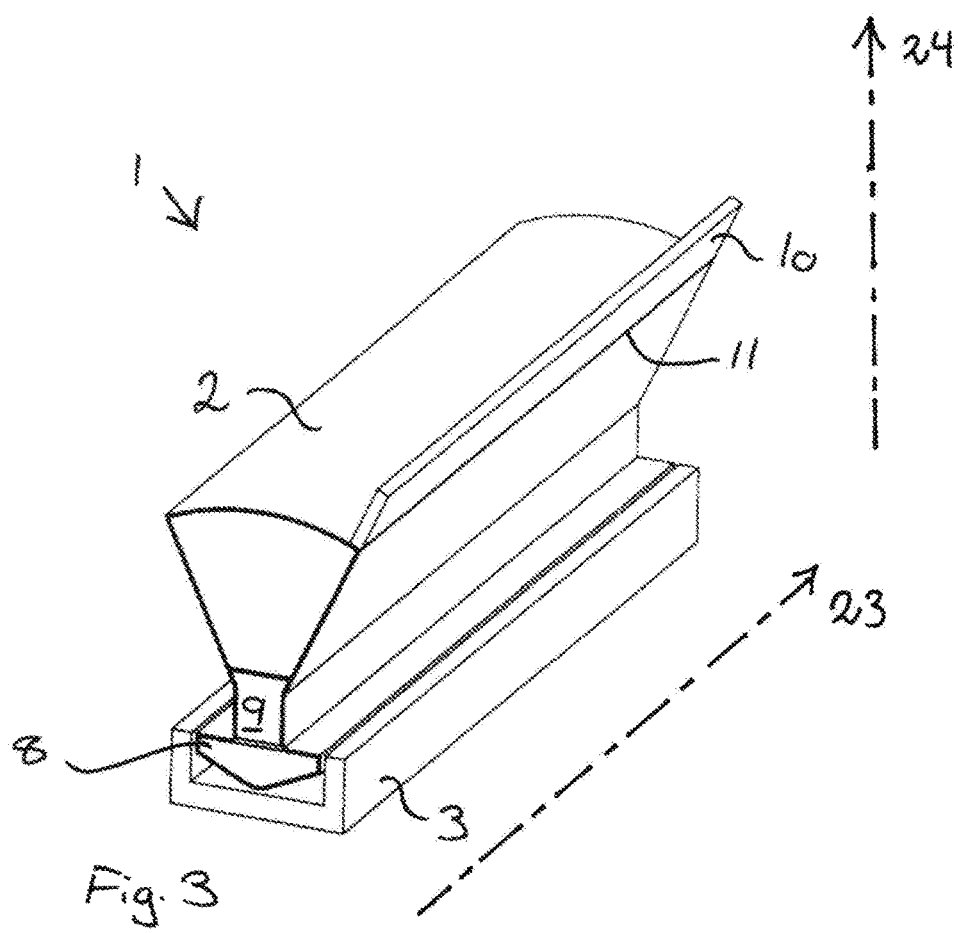
FIG. 3 shows an example of a U-shaped bottom rail.

FIG. 3 shows an example of a U-shaped bottom rail 3 in which the barrier element 2 is resting. The contour of the contact and the lower part of the barrier element are here drawn with a bold line, and at the bottom is seen a ballast space 9 for fixed ballast, and above this appears yet a ballast space to which ballast can be added or removed. Such an adjustment of ballast can advantageously be effected due to the rotated position and degree of loading of the barrier element. Irrespective of the existence of a downward force or not from the total system of lift and gravity, a flood protection 1 as shown here on FIG. 3 will be close to the bottom in that the contact 8 will be brought into contact with one side of the bottom rail 3 due to the greater water pressure at one side of the barrier element 3. In this Figure, the barrier 10 will also be seen as an element that can be folded down along the high water side 5 about its hinging line 11.

Figure 4:
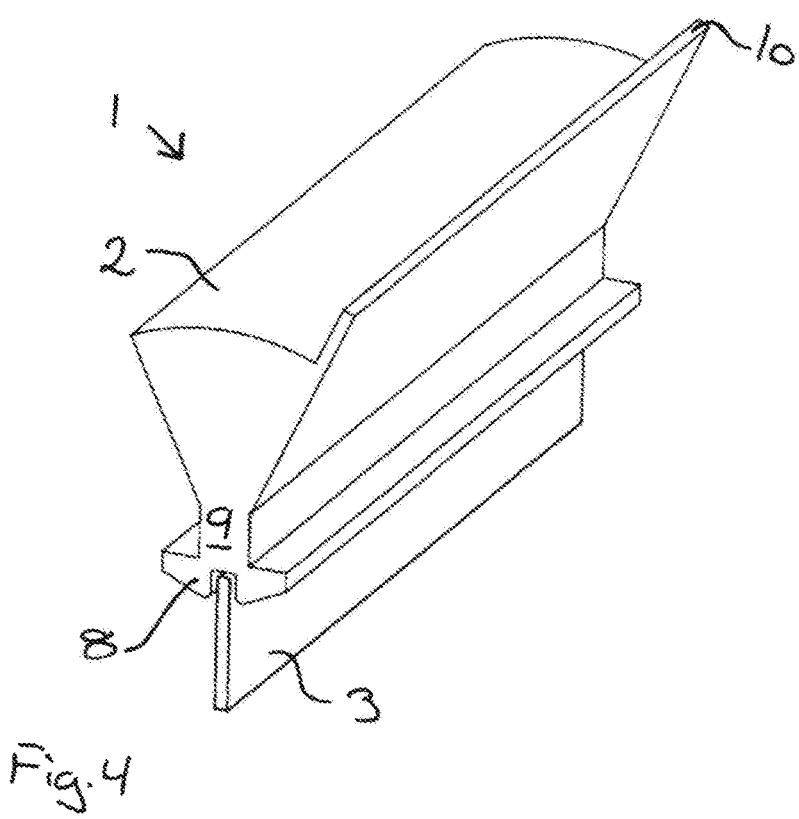
FIG. 4 shows an example of an I-shaped bottom rail.

In FIG. 4 is seen yet an example of a bottom rail 3, but here the bottom rail 3 has I-shape. In principle, there is no difference between the two shown solutions, and for that matter one solution is no better than the other. The two examples are indicated in order to show that there are several alternatives, and it must be understood that it is important that an abutment face is formed between the bottom rail system 3 and the contact 8 of the barrier element.

Figure 5:
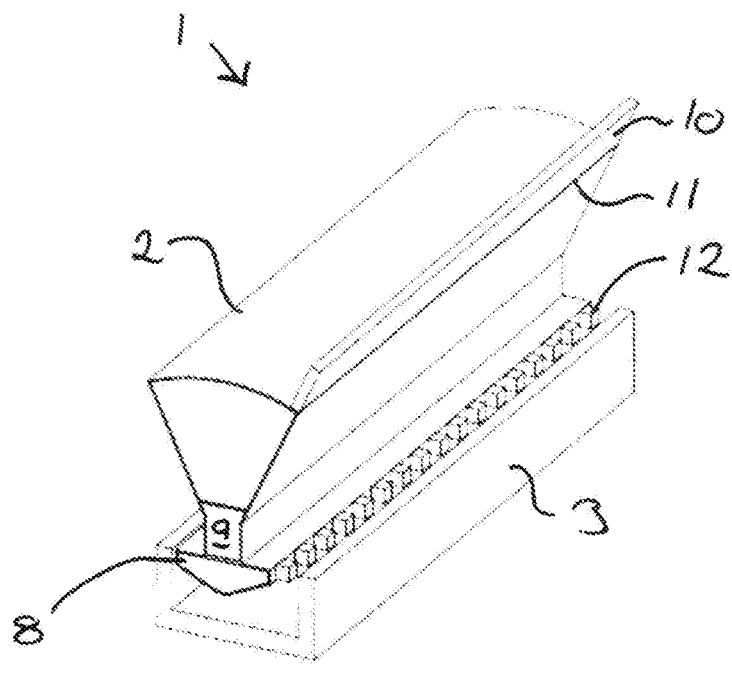
FIG. 5 shows an example of a flood protection with closed return valve.
Figure 6:
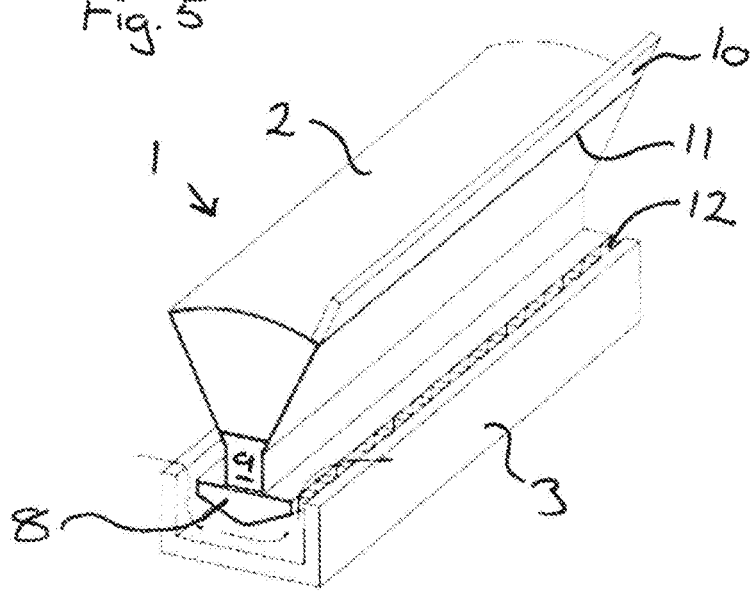
FIG. 6 shows an example of a flood protection with open return valve.

FIG. 5 shows an example of a flood protection 1 where a return valve 12 is arranged at the lower edge of the barrier element. The return valve 12 serves the purpose of letting water out from the low water side 4 when the water level on the high water side 5 again has dropped to a level corresponding to or under the level on the low water side 4. In the shown situation, the return valve 12 is closed as a situation with higher water level at the high water side 5 than at the low water side 4 is shown. As long as the horizontal pressure on the high water side 5 is greater, the contact 8 will press against the bottom rail 3 and ensure sealing action. When the horizontal pressure from the water shifts direction, the whole barrier element is pressed against the other side of the bottom rail system 3, and since a number of projections are formed at the return valve 12, water will be allowed to flow down under and past the contact 8 of the barrier element. The pressure is equalized equalised hereby, and the barrier elements 2 are relieved, which is seen on FIG. 6.

Figure 7:
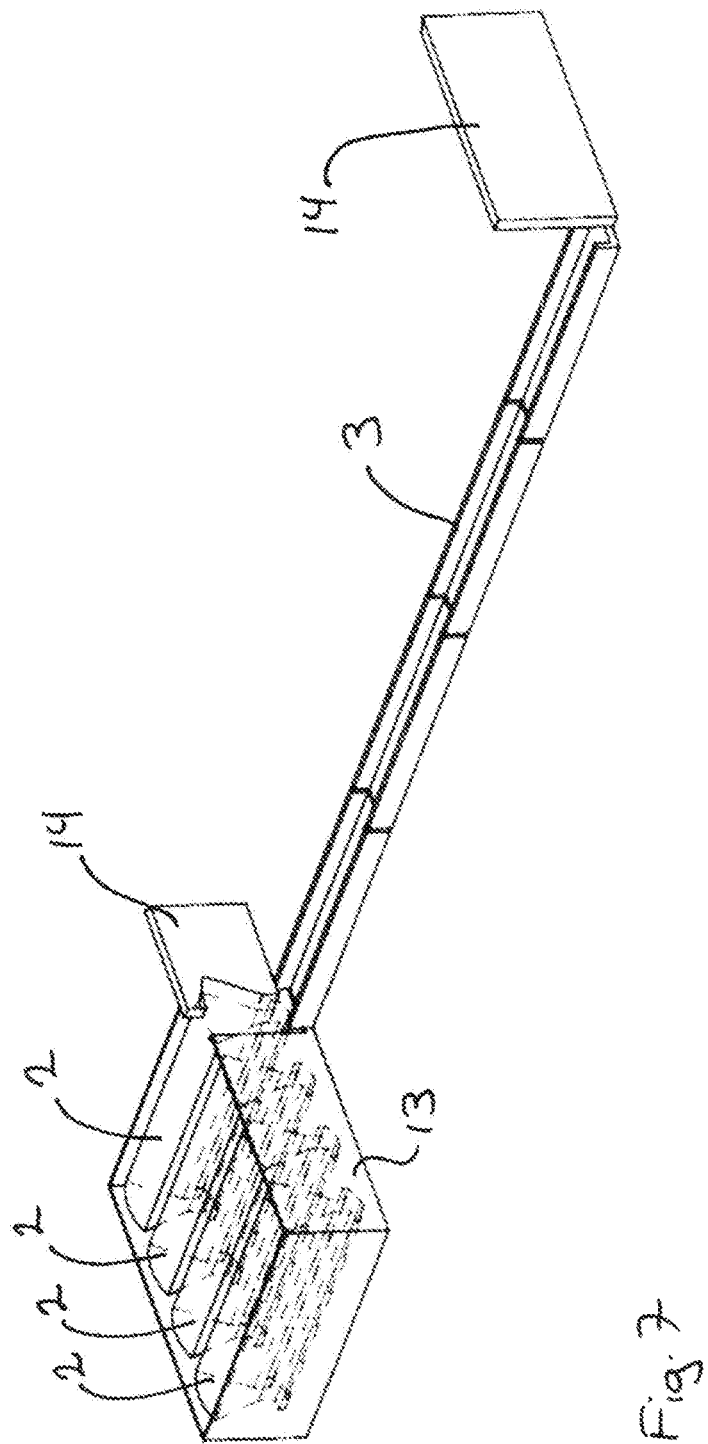
FIG. 7 shows a flood protection in open condition.

On FIG. 7 appears a flood protection 1 in open condition where the individual barrier elements 2 are arranged side by side in a depository 13. The barrier elements can be stored partially above water in the depository 13, but they may also be stored submerged and thereby invisible by filling ballast into the barrier elements 2, thereby submerging them. The depository 13 may advantageously be adapted such that the height of the edges are under normal water level, whereby the depository 13 appears hidden for the naked eye. When the flood protection 1 is to be used, respective barrier elements 2 are pulled/towed into position over the bottom rail 3 and between the shown side pieces 14. Then, or as the individual barrier elements 2 come into position, the ballast is adjusted according to need so that the necessary sealing and possible downwardly directed force is attained. The flood protection 1 will then be ready for use.

Figure 8:
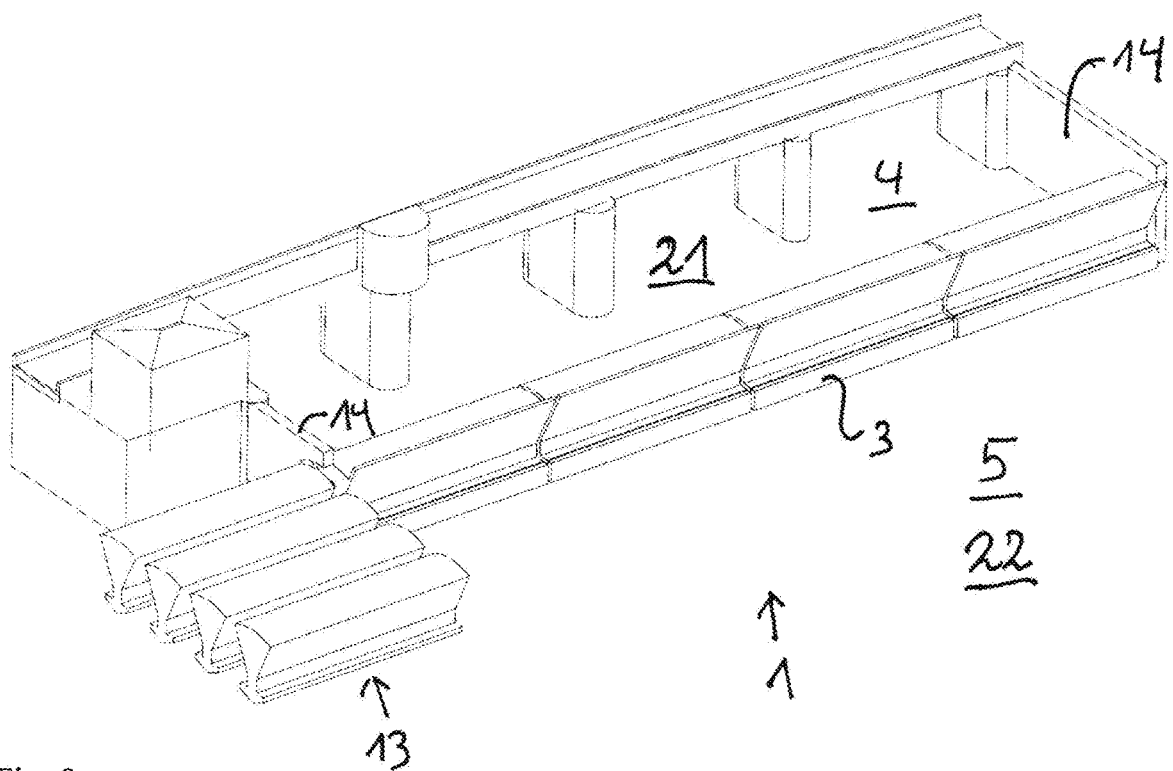
FIG. 8 shows an example of a flood protection.

FIG. 8 shows in principle the same as FIG. 7, but here the flood protection 1 is established and respective barrier elements 2 are in position, while only the contour of the barrier elements 2 are seen in the depository 13.

Figure 9:
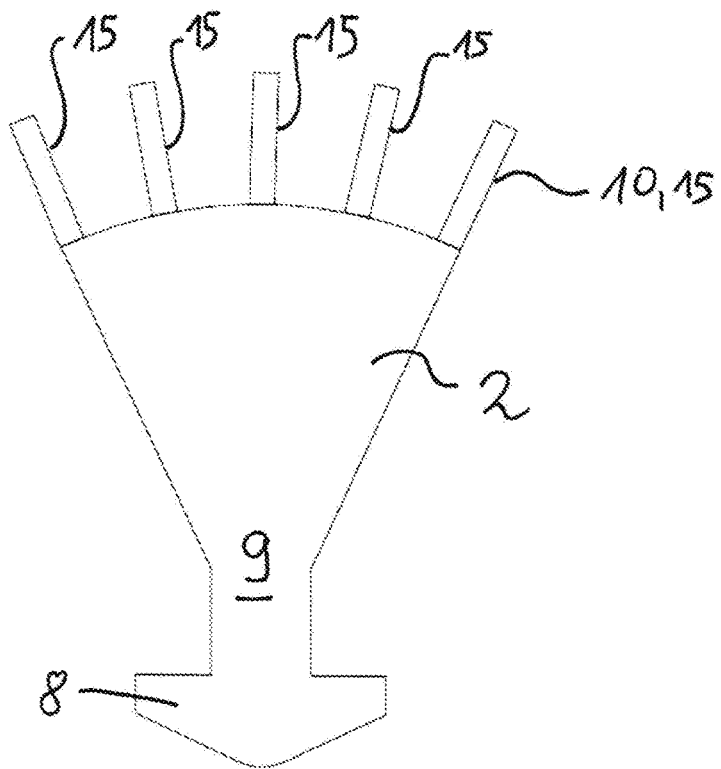
FIG. 9 shows a barrier element with gangway on the top.

FIG. 9 shows a barrier element 2 with a gangway at the top side where a barrier 10 constitutes screening to the sides, and where a further railing 15 is established between the outermost barriers 10. A gangway can have many forms and it may be just as wide as the surface of the barrier element or it can be placed at one side or at the middle, and the railing can have many different shapes.

Figures 10, 11:
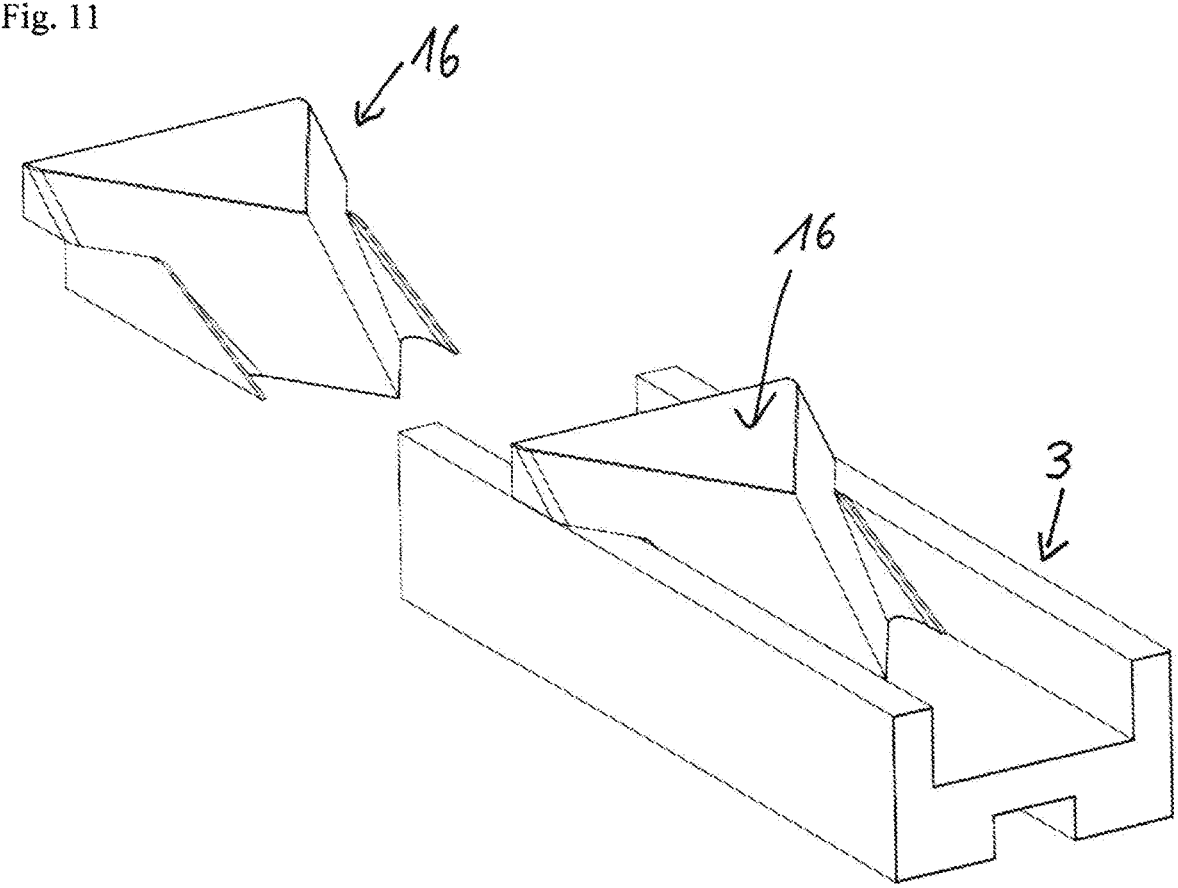
FIG. 10 is a perspective view of a cleaning tool in a U-shaped bottom rail.
FIG. 11 is a perspective view of a cleaning tool in a U-shape without bottom rail.

FIG. 10 shows a perspective view of a cleaning tool 16 in a U-shaped bottom rail. Here, the cleaning tool 16 has a profile/shape fitting rather precisely to the bottom rail 3 such that it can be pushed or drawn through bottom rail 3 and hereby be used for removing sand and other sediment from the bottom rail 3. Such an operation is typically performed immediately before positioning respective barrier elements 2 in connection with a storm surge warning. Moreover, it can be very relevant that the cleaning tool 16 is applied regularly in order to maintain the bottom rail 3 in order to ensure that a massive sanding or similar will not occur that otherwise would prevent establishing a flood protection within a relatively short time.

FIG. 11 shows the same cleaning tool as seen in FIG. 10, but here without bottom rail. As it appears on the Figure, this is a simple plough-like device that can be pushed but will preferably be pulled through the bottom rail, thereby displacing accumulated material.

In FIG. 12a is seen a flood protection with base and barrier element. It appears how an anchoring 17 of a U-shaped bottom rail 3 can be provided on the bottom of the area in which the flood protection 1 is to be established. As it appears, the bottom rail 3 is seated in a depression at the bottom of e.g. a fjord, but it could in principle be arranged upon the bottom. To dispose the bottom rail 3 directly upon the bottom can be advantageous in case of e.g. a rocky bottom.

The anchoring 17 is rather simple and consists in all its simplicity of a number of earth rods rammed down in the bottom with suitable spacing. Since the barrier elements 2 are largely in balance during operation, only modest loads are to be absorbed in the bottom rail 3, why such a simple anchoring is sufficient. At the same time is achieved an approximately negligible action on the bottom and the environment on the bottom of the fjord, stream or similar in question.

Figure 12:
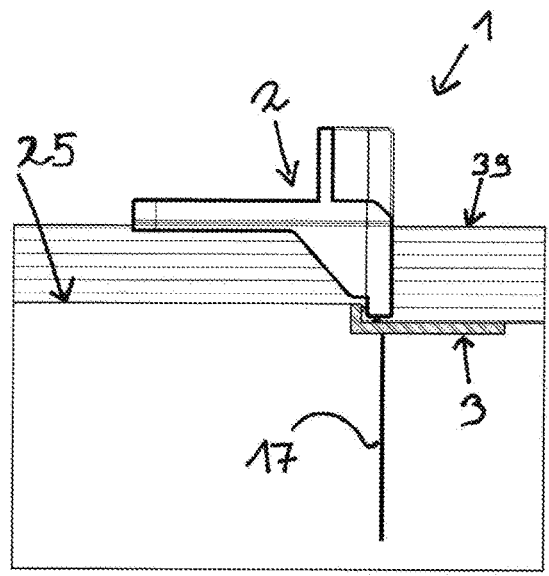
FIGS. 12a, 12B, 12C and 12C show various examples of anchoring bottom rails and their anchorage at the bottom.
Figure 12:
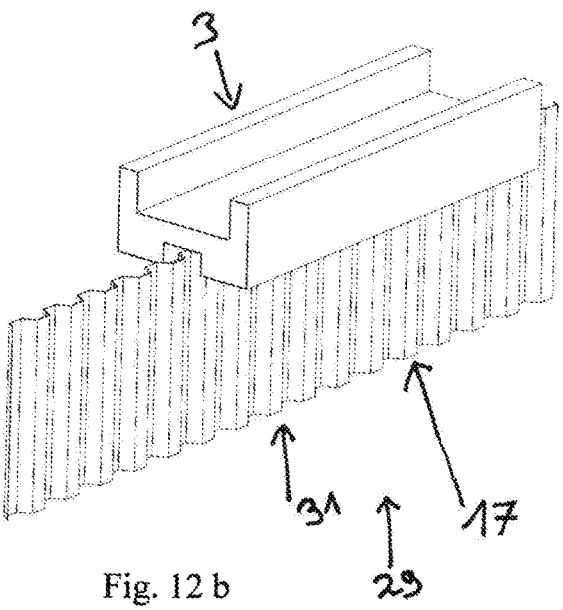
Figure 12C:
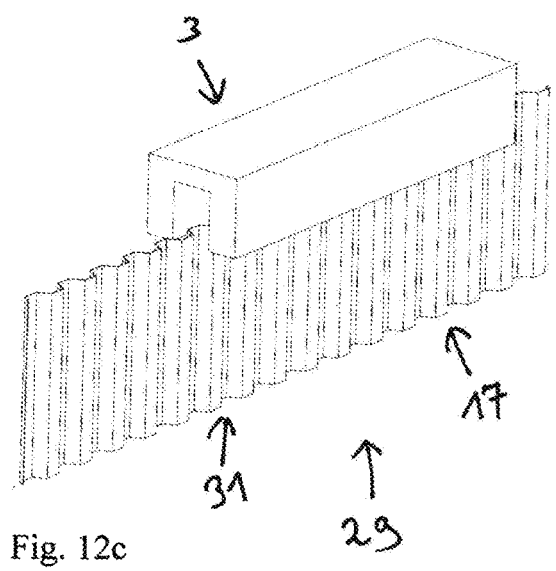
Figure 12D:
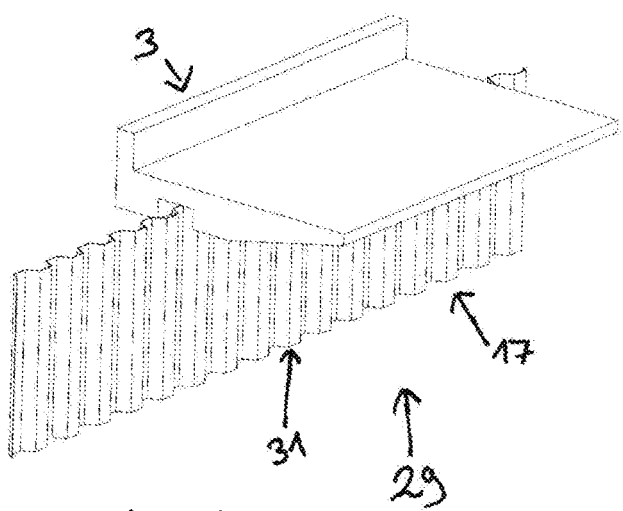

FIGS. 12 b-d show bases with different rail profiles that are anchored in the bottom with a sheet piling. FIG. 12 b shows a base with a U-shaped bottom rail mounted on a sheet piling to be rammed into the bottom. FIG. 12 c shows a base with a four-edged bottom rail mounted on a sheet piling to be rammed into the bottom. FIG. 12 d shows a base with a bottom rail shaped as a lying "L" mounted on a sheet piling to be rammed into the bottom.

Figure 13:
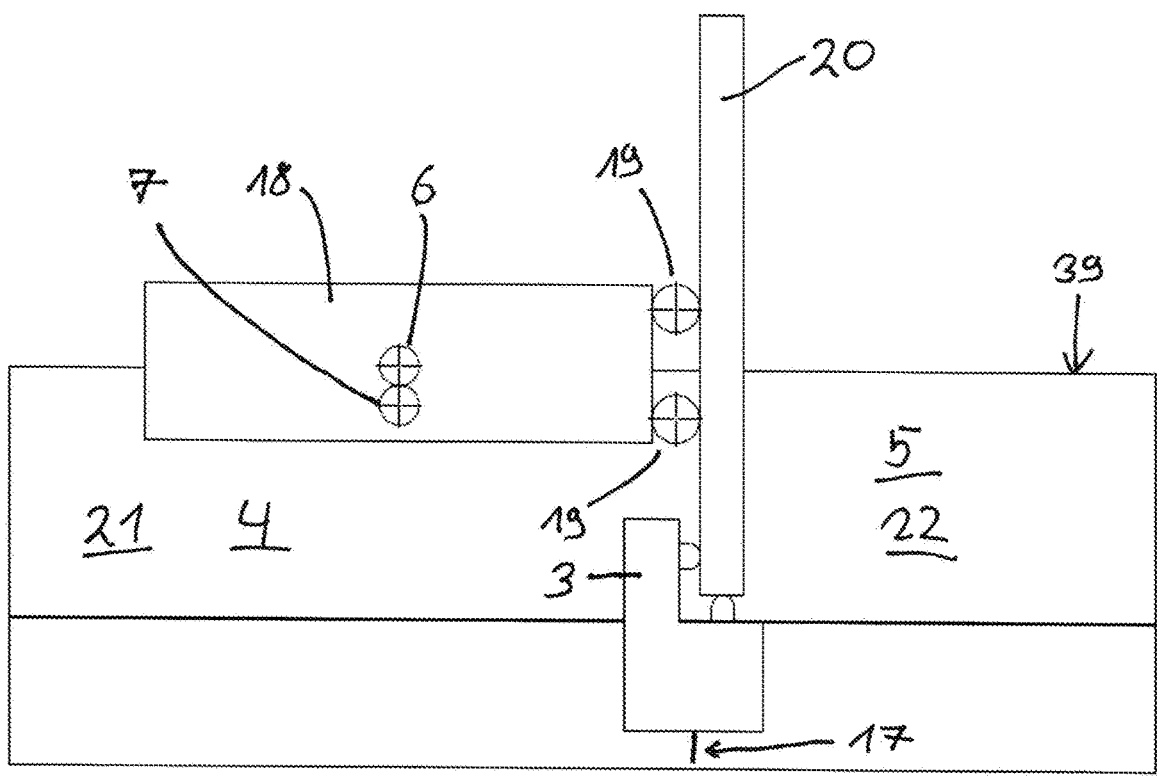
FIG. 13 shows a flood protection with translational bearings between floating body and gate element in unloaded condition.

FIG. 13 shows a flood protection 1 with translational bearings 19 between a floating body 18 and a gate element 20, together constituting a barrier element 2, here shown in unloaded condition. The same principles as in the above mentioned variant are indicated in this variant of the invention. However, here the difference is that the barrier element 2 does not produce the stabilising, arighting moment by itself, this is produced by the floating body 18. However, the effect is the same as the floating body is connected to the gate element 20 via the translational bearings 19. The translational bearings 19 only have the purpose of ensuring that the floating body can follow the water level at the low water side 4.

Figure 14:
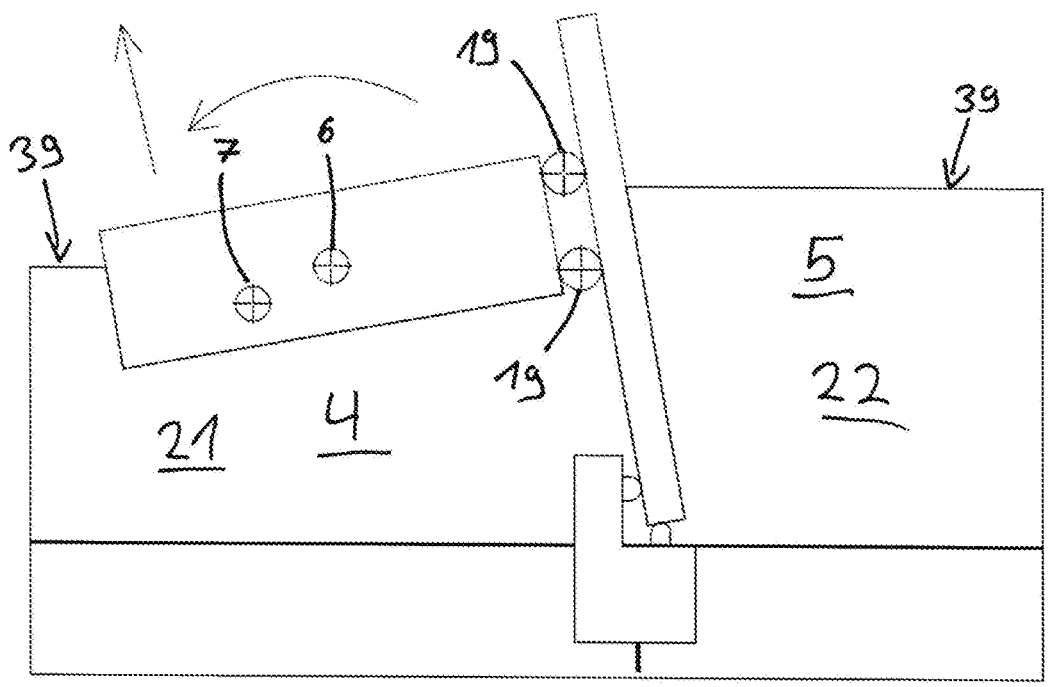
FIGS. 14A and 14B show a flood protection with translational bearings between floating body and gate element in loaded condition.
Figure 14:
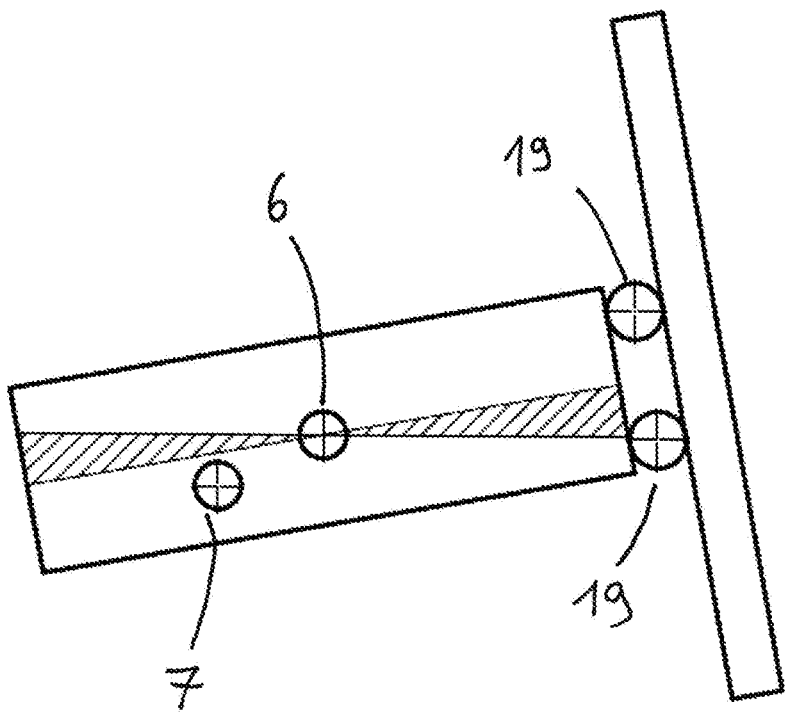

In FIGS. 14 a and 14 b are seen a flood protection 1 with translational bearings 19 between floating body 18 and gate element 20 in loaded condition, as the water level on the high water side 5 is considerably increased compared to the shown on FIG. 13. By rotation of the barrier element, the buoyancy centre 7 is displaced in relation to the gravity centre 6, and the moment counteracting the forces from the different water levels at the high water side 5 and the low water side 4 is established thereby. The bottom rail is made as a single rail.

Figure 15:
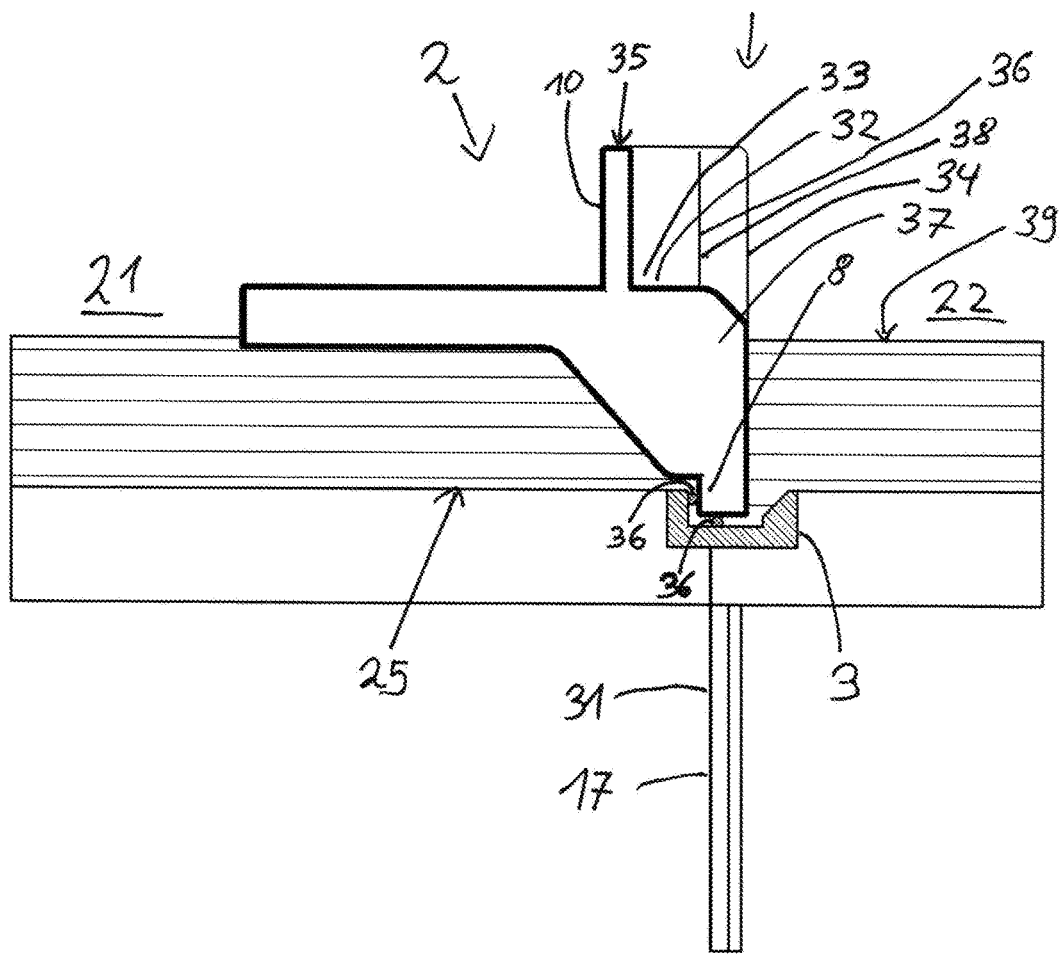
FIG. 15 is a schematic drawing of a flood protection in a U-shaped bottom rail in unloaded condition.

FIG. 15 shows a flood protection 1 with barrier element 2 with a base 29 that includes a U-shaped bottom rail 3 with a rounded corner at the top of a sheet piling 31, which is rammed into the bottom 25. The water levels are the same in the front area 22 and the back area 21. The barrier element 2 is in contact with the bottom rail through contact 8. A seal means 36 appears between a side face of the contact 8 on the barrier element, and a side face of the bottom rail 3 and the seal 36 between a bottom face of the contact 8 on the barrier element and a bottom face of the bottom rail 3.

The barrier element 2 includes a sub-section of surface 32, which during high water will be in an area near the water surface in the front area. The sub-section of surface 32 forms a depression 33 that can receive water when the barrier element is tilting by higher water level in the front area 22 than in the back area 21, such that the weight of the received water counteracts a further buoyancy force arising when the barrier element 2 is tilting in relation to an equilibrium position with equal water levels in the front area 22 and the back area 21.

The end face 37 of the barrier element 2 includes a supplemental part 34 extending in height direction from the sub-section of surface 32 towards the top 35 of the barrier 10, extending from the barrier 10 towards the front area 22. A sub-section 38 of the seal 36 is provided on the supplemental part 34.

Figure 16:
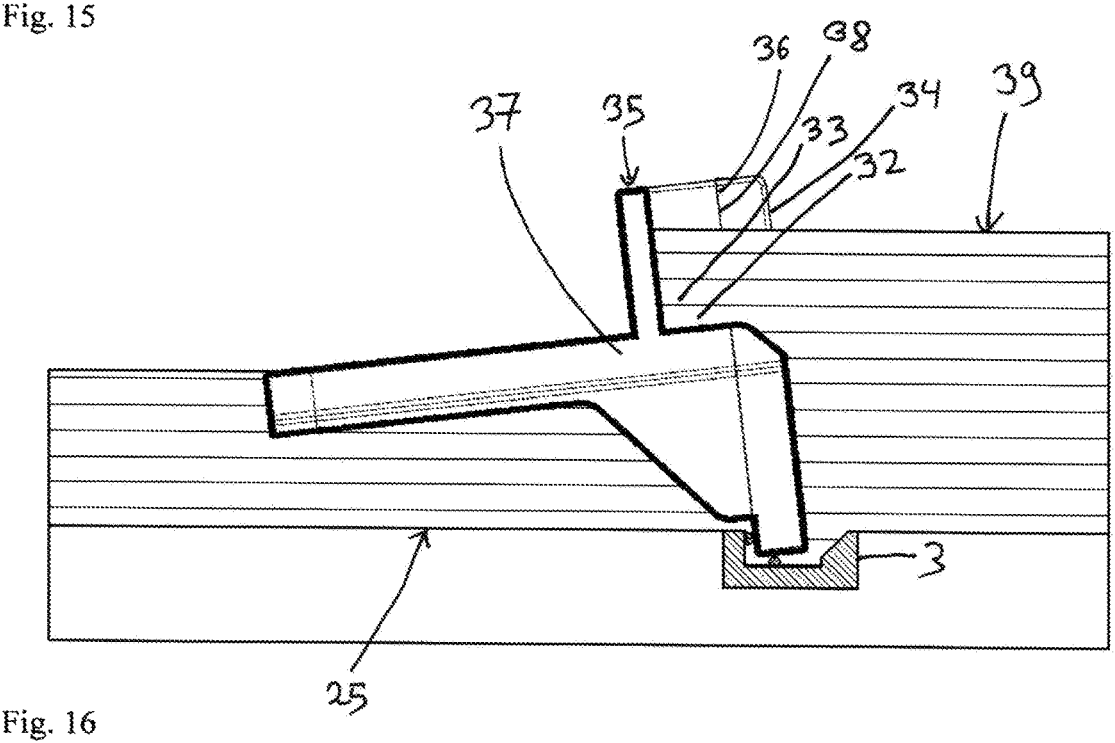
FIG. 16 is a schematic drawing of a flood protection in a U-shaped bottom rail in loaded condition.

FIG. 16 shows a flood protection 1 with barrier element 2 with a base 29 that includes a U-shaped bottom rail 3 with a rounded corner at the top of a sheet piling 31 which is rammed into the bottom 25. The water level is higher in the front area 22 than in the back area 21 such that the barrier element is tilted. The barrier element 2 is in contact with the bottom rail through the contact 8. The seal 36 appears between a side face of the contact 8 on the barrier element and a side face of the bottom rail 3, and the seal 36 between a bottom face of the contact 8 on the barrier element and a bottom face of the bottom rail 3.

The barrier element 2 includes a sub-section of surface 32, which during high water will be in an area near the water surface 39 in the front area. The sub-section of surface 32 forms a depression 33 that can receive water when the barrier element is tilting by higher water level in the front area 22 than in the back area 21, such that the weight of the received water counteracts a further buoyancy force arising when the barrier element 2 is tilting in relation to an equilibrium position with equal water levels in the front area 22 and the back area 23.

The end face 37 of the barrier element 2 includes a supplemental part 34 extending in height direction from the sub-section of surface 32 towards the top 35 of the barrier 10, extending from the barrier 10 towards the front area 22. A sub-section 38 of the seal 36 is provided on the supplemental part 34.

Figure 17:
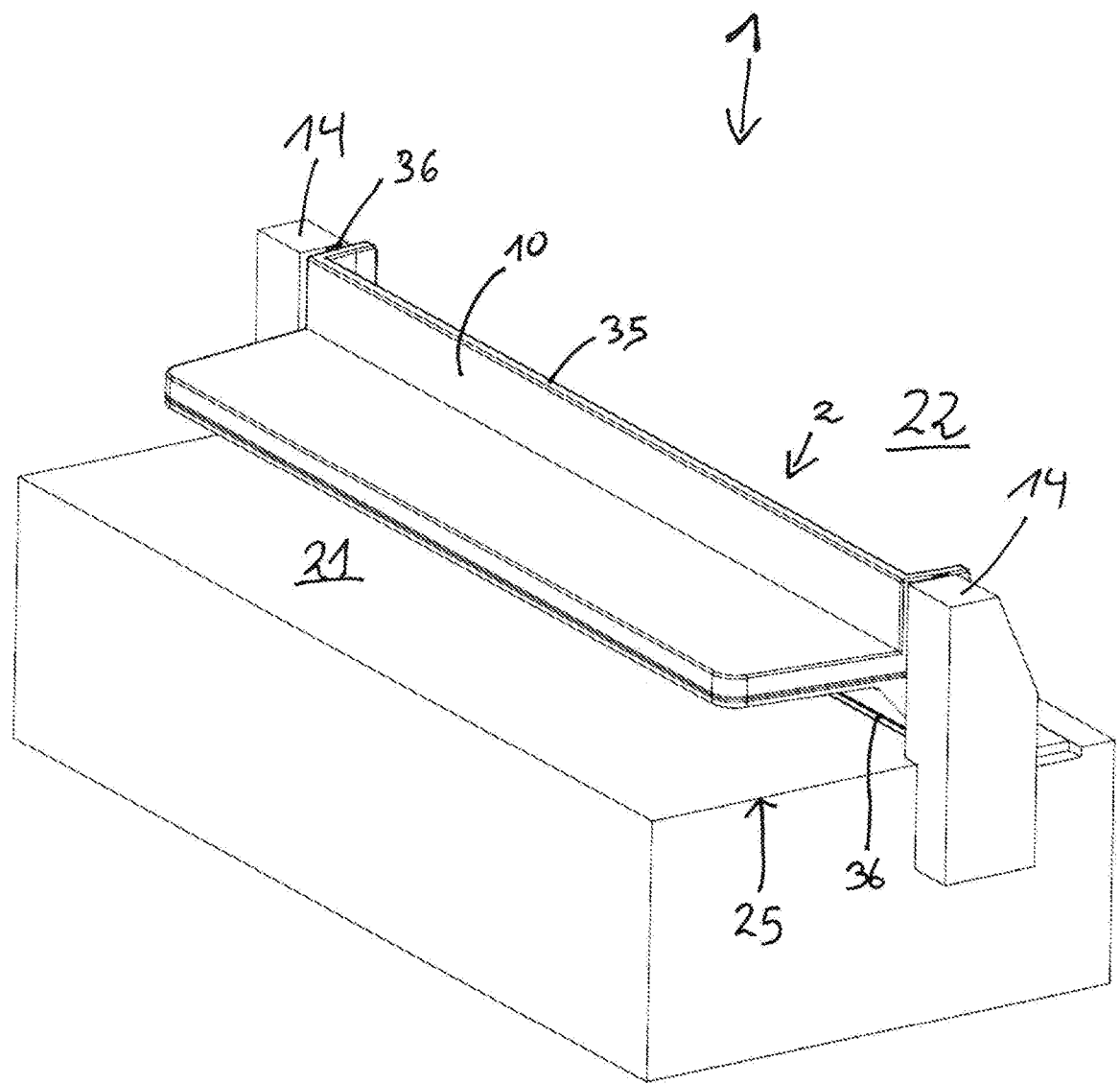
FIG. 17 is a schematic drawing of a flood protection in a U-shaped bottom rail in unloaded condition, in perspective view.

In FIG. 17 is seen the same flood protection as shown in FIG. 16, in perspective view. The barrier element is in an active position, i.e. in a situation of use between side pieces 14. The water levels in the back area 21 and the front area 22 are at the same level.

Figure 18:
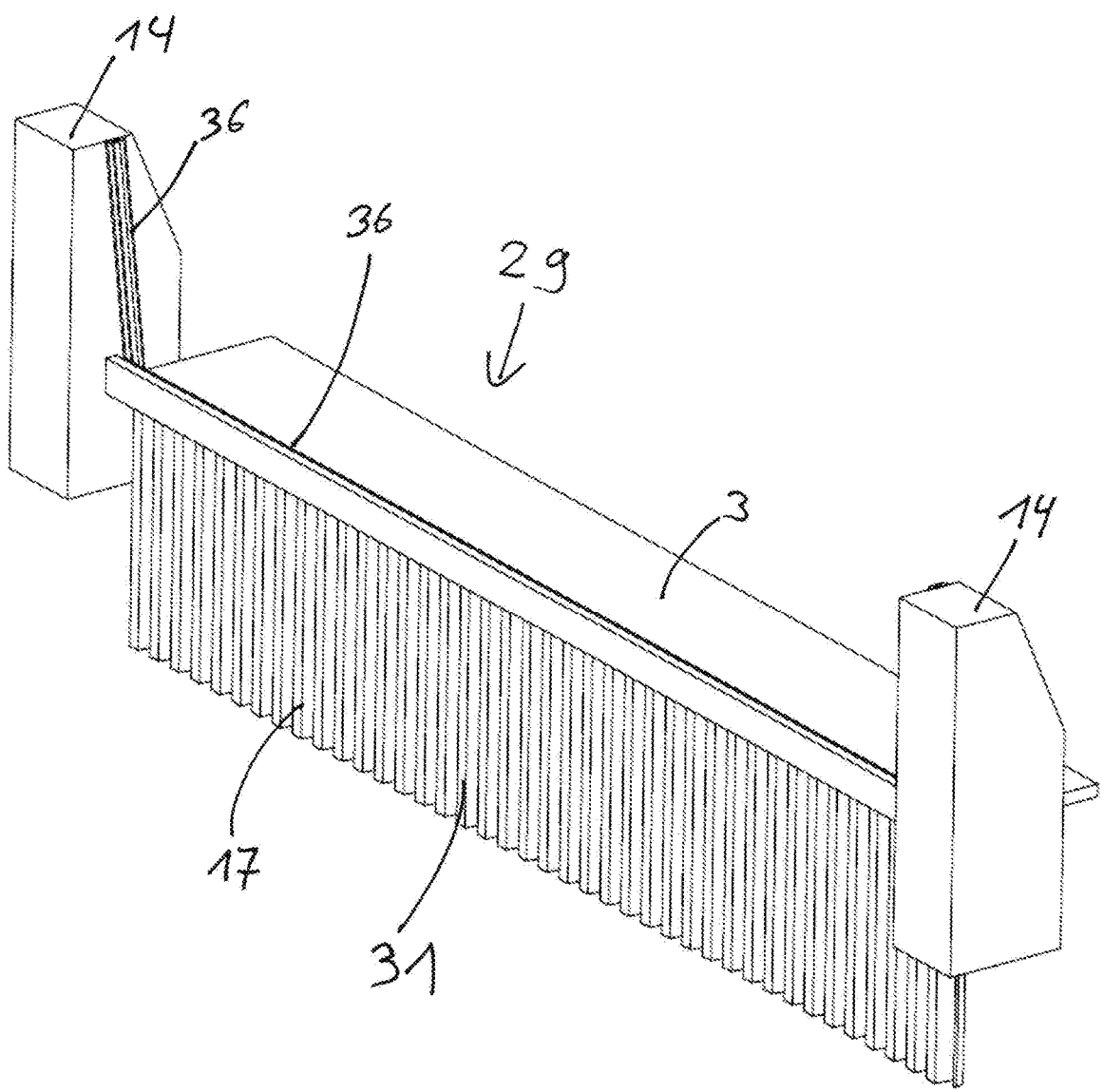
FIG. 18 is a schematic drawing of a base for a flood protection and side pieces.

In FIG. 18 is seen the base 29 and side pieces 14 of the same flood protection 1 as shown in FIGS. 16 and 17. Base and side pieces are shown in perspective view. A seal appears in the bottom rail 3 and on the side pieces 14. The base is anchored in the bottom 25 by a sheet piling 31.

Figure 19:
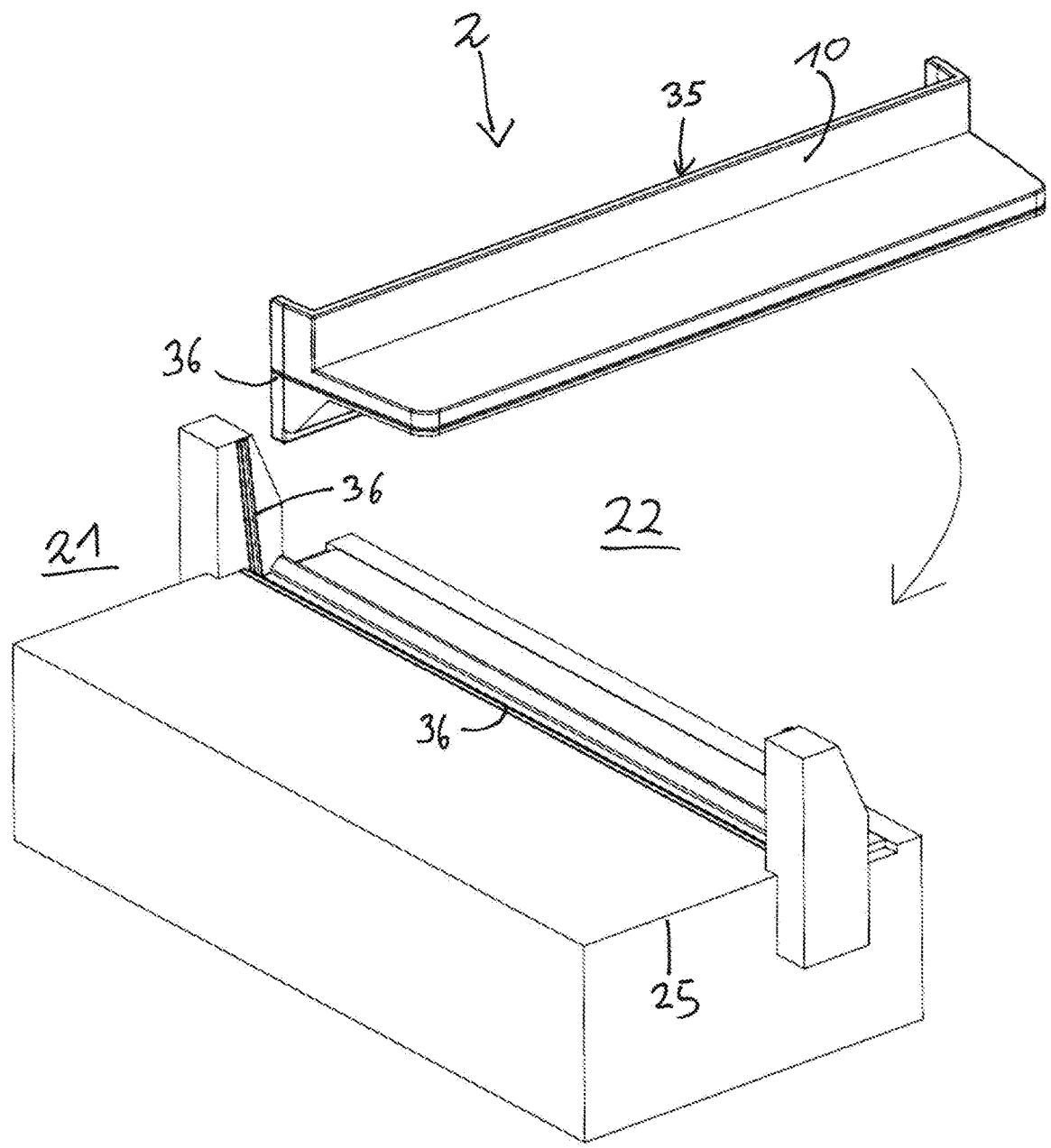
FIG. 19 is a schematic drawing of a flood protection where the barrier element is brought into active position, i.e. a position of use.

In FIG. 19 is seen the same flood protection as shown in FIGS. 16 to 18. The barrier element 2 is shown in perspective view. A seal appears in the bottom rail 3 and on the side pieces 14. The barrier element 2 is arranged pivoting about a substantially vertical axis. After rotation about the axis, the barrier element is lowered in position in a bottom rail system 3, thereby protecting the back area against rising water level in the front area.

Figure 20:
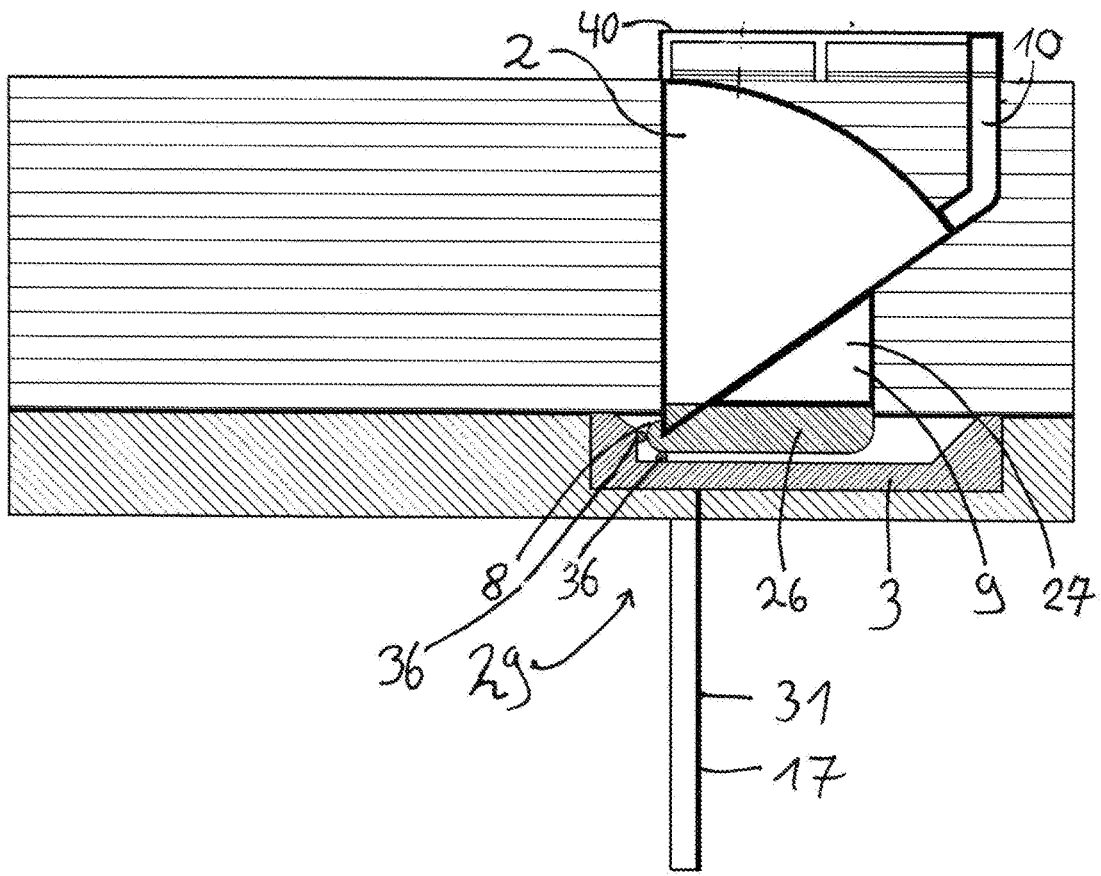
FIG. 20 is a schematic drawing of a flood protection with a barrier element with tapering shape, as seen in longitudinal direction.

FIG. 20 shows a schematic drawing of a flood protection 1 as seen in longitudinal direction. The flood protection 1 includes a tapered barrier element 2 with a base 29 that includes a U-shaped bottom rail 3 with a rounded corner at the top of a sheet piling 31. The barrier element 2 is in contact with the bottom rail through the contact 8. A seal 36 appears between a side face of the contact means 8 on the barrier element and a side face of the bottom rail 3, and the seal 36 between a bottom face of the contact 8 on the barrier element and a bottom face of the bottom rail 3. The barrier element 2 includes a fixed ballast 26 and a ballast space 9 for adjustable ballast 27, which is constituted by water. The barrier element 2 includes an adjustable barrier 10 and a gangway 40 at the top of the barrier element as seen in height direction.

Figure 21:
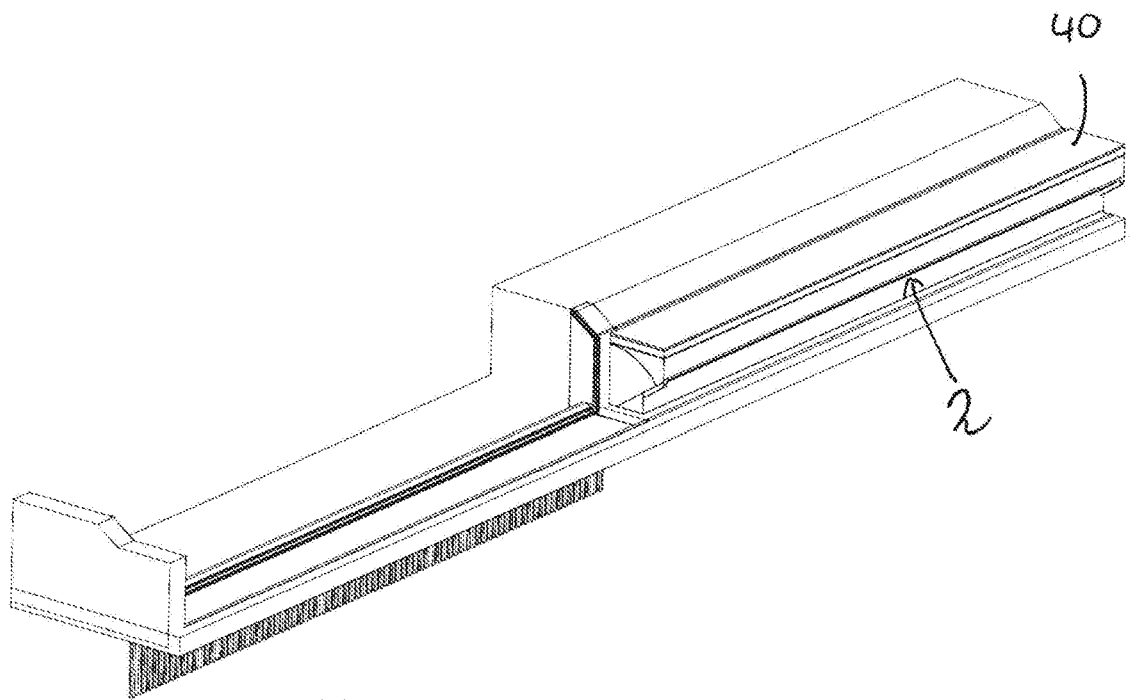
FIG. 21 is a schematic drawing of a flood protection with a barrier element with tapering shape in an inactive position, in perspective view.

In FIG. 21 is seen the same embodiment of the flood protection 1 as in FIG. 20, in perspective view. The barrier element 2 is not in an active position, i.e., not in a situation of use. In this inactive position, the barrier element can be utilized as gangway and as a part of a quay construction so that it does not occupy unnecessary space a harbor. A seal 36 appears on the side pieces 14 and on the base.

Figure 22:
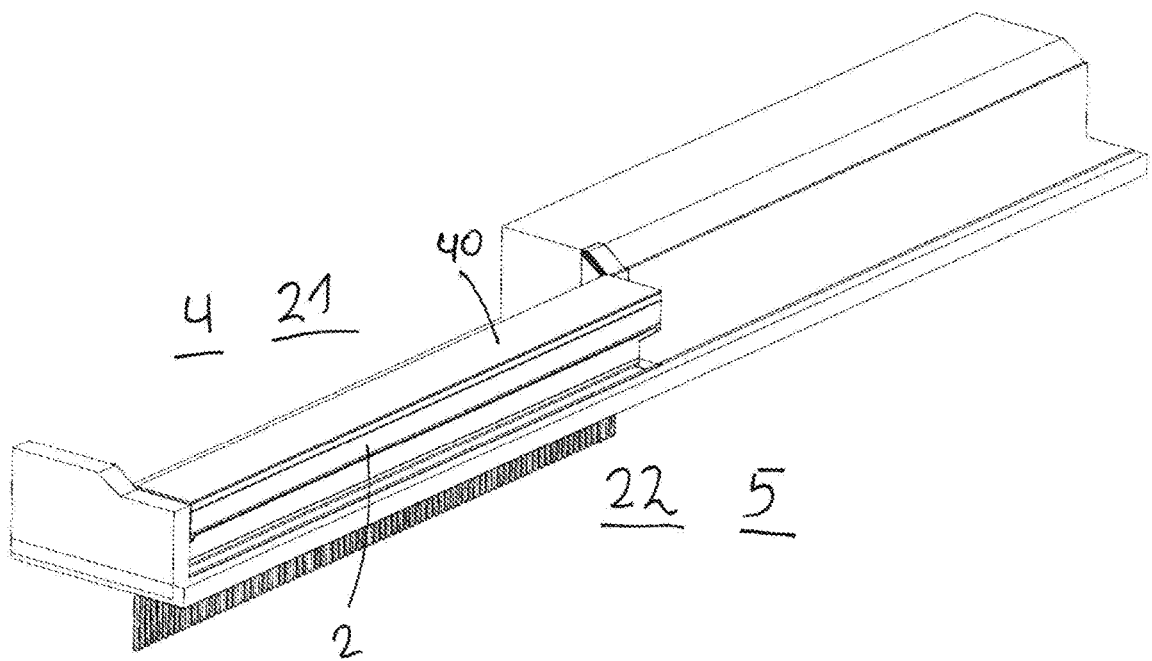
FIG. 22 is a schematic drawing of a flood protection with a barrier element with tapering shape in an active position in unloaded condition, in perspective view.

In FIG. 22 is seen the same embodiment of the flood protection 1 as in FIGS. 20 and 21, in perspective view. The barrier element 2 is in an active position, i.e. in a situation of use. The water levels in the front area 22 and the back area 21 are at the same level. The barrier element can be used as gangway in this active position and by equal water levels.

Figure 23:
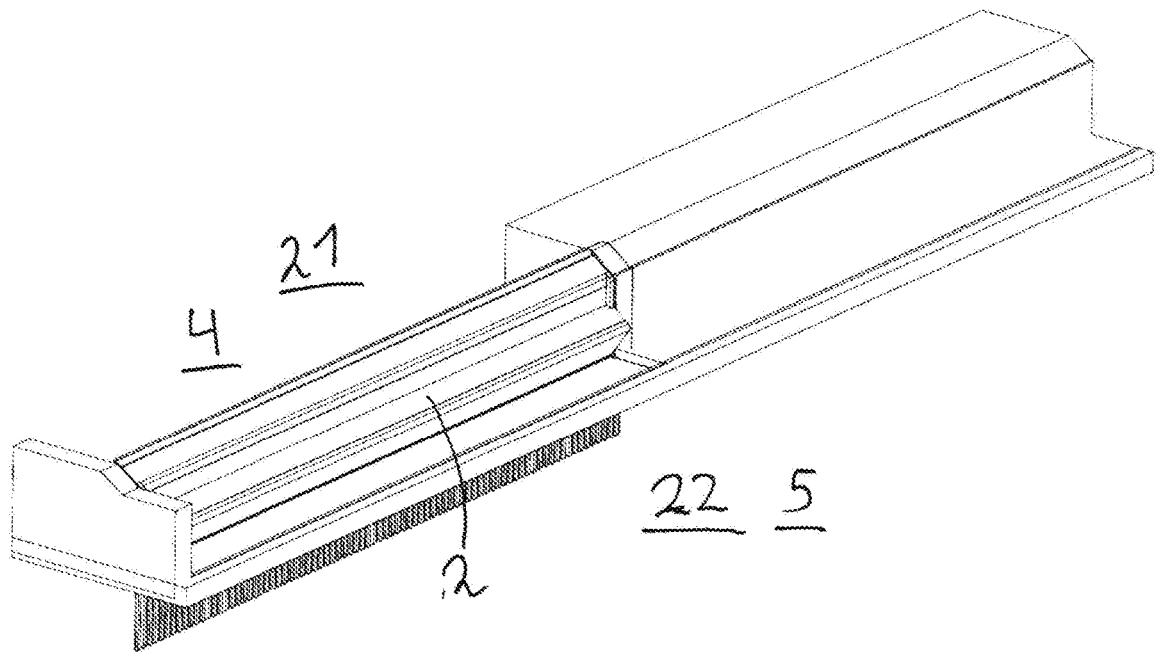
FIG. 23 is a schematic drawing of a flood protection with a barrier element with tapering shape in an active position in loaded condition, in perspective view.

In FIG. 23 is seen the same embodiment of the flood protection 1 as in FIGS. 20 to 22, in perspective view. The barrier element 2 is in an active position, i.e. in a situation of use. The water level in the front area 22 is higher than in the back area 21.

Figure 24:
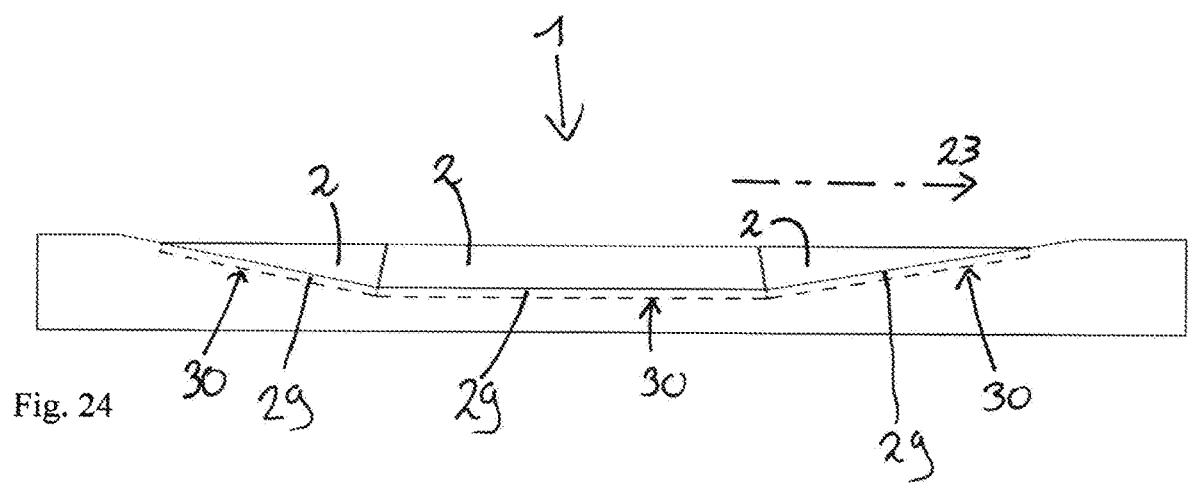
FIG. 24 is a schematic drawing of a flood protection with a base following the bottom course, as seen at right angles to the longitudinal direction.

FIG. 24 is a schematic drawing of the flood protection 1 where the base 29 substantially follows the bottom course 30 in longitudinal direction 23. The barrier elements 2 are adapted so as to follow the base 29 in longitudinal direction 23 in an operational situation. By this configuration is achieved a cheaper construction compared with solutions where the base is to be horizontal, as cost-intensive works at the bottom for establishing a horizontal base are avoided.

Figure 25:
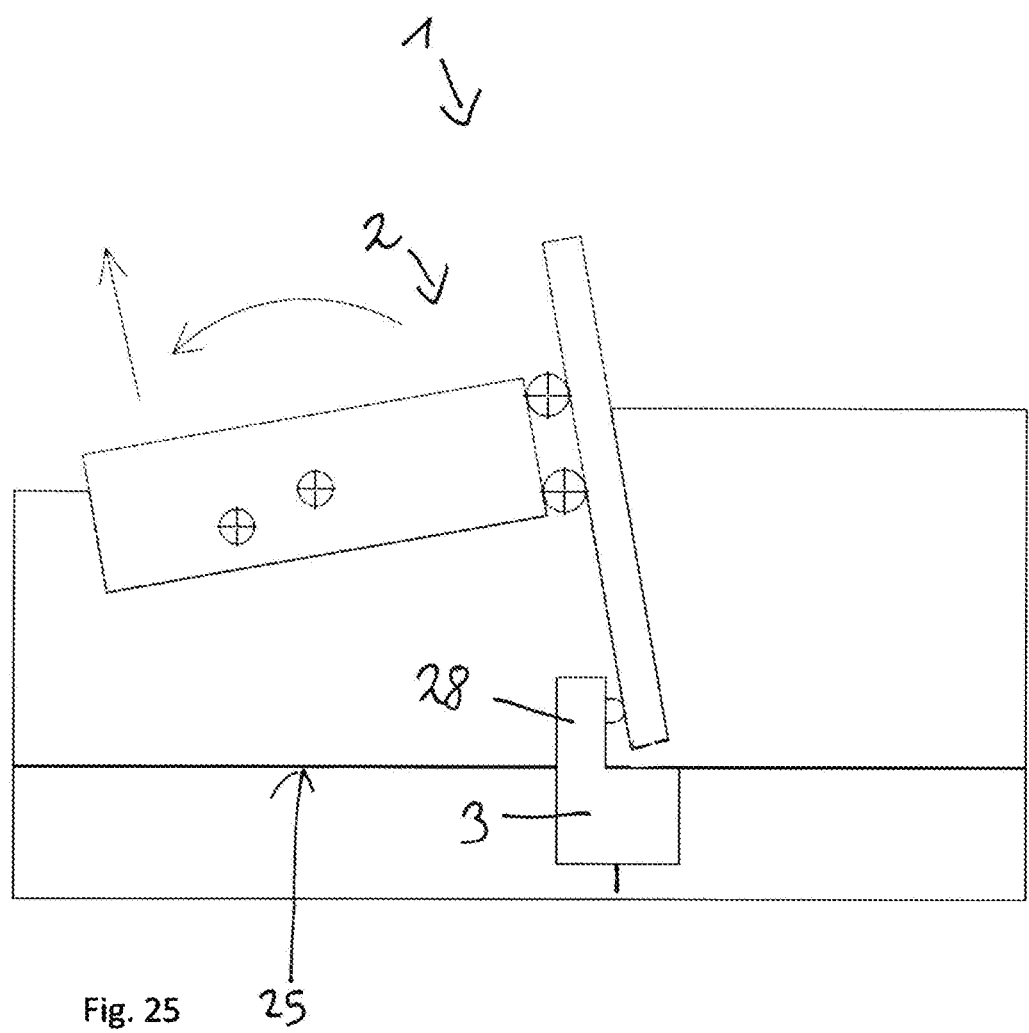
FIG. 25 is a schematic drawing of a flood protection with a base including a single rail, as seen at right angles to the longitudinal direction.

FIG. 25 shows a schematic drawing of a flood protection 1 where the bottom rail system 3 is formed by a single rail 28, where only the barrier element 2 bears against one side of the bottom rail system 3.

The invention claimed is:

1. A flood protection for protecting a back area against rising water level in a front area, the flood protection configured to be arranged in an area between the back area and the front area and to operate between a bottom of the area and a water surface of the area, the flood protection comprising:
    a base arranged at the bottom of the area, the base comprising a bottom rail system extending substantially transversely of the area, the bottom rail system comprising a contact face;
    at least one barrier element having a longitudinal direction and a height direction, the longitudinal direction during operation extending substantially transversely of the area, the height direction during operation extending substantially transversely of the area and upward from the bottom of the area, and wherein the at least one barrier element comprises:
        a contact;
        an adjustable ballast system being configured to regulate buoyancy balance of the at least on barrier element;
    wherein the contact has a structure that contacts the contact face of the bottom rail during operation as flood protection by regulation of the buoyancy balance by the adjustable ballast system such that a sufficient downward action of force on the bottom rail system is attained;
    wherein the contact of the at least one barrier element and the contact face of the bottom rail system are configured such that the at least one barrier element under the action of a greater water pressure at one side of the at least one barrier element than at another side of the at least one barrier element will act on the bottom rail system with a horizontal force, and, due to the greater water pressure at the one side of the at least one barrier element, the at least one barrier element tilts to a given angle relative the contact face of the bottom rail system, wherein a center of buoyancy of the at least one barrier element is displaced in relation to a center of gravity of the at least one barrier element; and
    wherein the contact of the at least one barrier element is configured to be raised out of interaction with the contact face of the bottom rail system by regulation of the buoyancy balance by the adjustable ballast system and moved into a depository for storage when not in operational use as flood protection, the depository being located separately from the base, wherein the contact of the at least one barrier element when not in operational use as flood protection cannot act on the bottom rail system with a horizontal force.

2. The flood protection according to claim 1, wherein the at least one barrier element comprises a fixed ballast and where the adjustable ballast is constituted by water.

3. The flood protection according to claim 1, wherein the at least one barrier element is arranged so that the center of buoyancy of the at least one barrier element is positioned higher than the center of gravity of the at least one barrier element and therefore the at least one barrier element is stable.

4. The flood protection according to claim 1, wherein at least one of the contact of the at least one barrier element and the bottom rail system comprise a passive valve, the passive valve being activated when a first water pressure behind the flood protection is greater than a second pressure in front of the flood protection.

5. The flood protection according to claim 1, wherein the at least one barrier element has a substantially tapering cross-section having a narrow end facing the bottom rail system, and a wide end facing upwards from the bottom of the area.

6. The flood protection according to claim 1, wherein the at least one barrier element comprises an adjustable barrier arranged tiltable or movable in other ways at an upper edge of the at least one barrier element.

7. The flood protection according to claim 1, wherein the at least one barrier element is arranged pivoting about a substantially vertical axis, wherein the at least one barrier element after pivoting about the substantially vertical axis is lowered into a position in the bottom rail system so as to provide blockage between the front area and the back area.

8. The flood protection according to claim 1, wherein the at least one barrier element comprises at least two barrier elements, where at least one end face of one of the at least two barrier elements comprises a seal that bears against an end face of a second of the at least two barrier elements that is adjacent to the one of the at least two barrier elements.

9. The flood protection according to claim 1, wherein the bottom rail system is formed by a single rail, where only the at least one barrier element bears against one side of the bottom rail system.

10. The flood protection according to claim 1, wherein the base substantially follows a course of the bottom in a longitudinal direction, and that the at least one barrier element is adapted so as in operation to follow the base in the longitudinal direction.

11. The flood protection according to claim 1, wherein the base is anchored substantially at the bottom by a sheet piling.

12. The flood protection according to claim 1, wherein the at least one barrier element comprises a sub-section of surface that during high tide will be in an area near the water surface in the front area, the sub-section forming a depression receiving water when the barrier element is tilting by higher water level in the front area than in the back area, such that a weight of received water counteracts a further buoyancy force arising when the at least one barrier element is tilting in relation to an equilibrium position with equal water level in the front area and the back area.

13. The flood protection according to claim 12, wherein end faces of the at least one barrier element comprise a supplemental part extending in the height direction from the sub-section of surface towards a top of the at least one barrier element, and having an extension from the at least one barrier element towards the front area, on which supplemental part there is provided a sub-section of a seal.

14. The flood protection according to claim 1, wherein the area is a stream, a fjord, a river, or an estuary.

15. The flood protection according to claim 1, wherein the contact is arranged at a bottom of the at least one barrier element and extends along the at least one barrier element in the longitudinal direction.

16. The flood protection according to claim 1, wherein the bottom rail system comprises a U-, I- or L-shaped bottom rail which interacts with a corresponding shape on the at least one barrier element.

17. The flood protection according to claim 4, wherein the passive valve comprises one or more return valves.

* * * * *